US011306598B2

(12) United States Patent
Roussille et al.

(10) Patent No.: US 11,306,598 B2
(45) Date of Patent: Apr. 19, 2022

(54) METHOD FOR MANUFACTURING A TURBINE ENGINE VANE MADE OF A COMPOSITE MATERIAL, RESULTING VANE AND TURBINE ENGINE INCLUDING SAME

(71) Applicant: SAFRAN AIRCRAFT ENGINES, Paris (FR)

(72) Inventors: Clément Roussille, Bordeaux (FR); Jéremy Blachier, Bordeaux (FR); Marie Lefebvre, Merignac (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 102 days.

(21) Appl. No.: 16/676,551

(22) Filed: Nov. 7, 2019

(65) Prior Publication Data
US 2020/0232331 A1 Jul. 23, 2020

Related U.S. Application Data

(62) Division of application No. 15/312,944, filed as application No. PCT/FR2015/051337 on May 21, 2015, now Pat. No. 10,519,786.

(30) Foreign Application Priority Data

May 22, 2014 (FR) ...................................... 1454607

(51) Int. Cl.
*F01D 5/28* (2006.01)
*F01D 5/22* (2006.01)
(Continued)

(52) U.S. Cl.
CPC ............ *F01D 5/282* (2013.01); *C04B 35/565* (2013.01); *C04B 35/71* (2013.01); *C04B 35/80* (2013.01);
(Continued)

(58) Field of Classification Search
CPC . F01D 5/282; F01D 9/02; F01D 5/284; F01D 5/225; F01D 11/122; C04B 35/565;
(Continued)

(56) References Cited

U.S. PATENT DOCUMENTS

| 5,845,398 A | 12/1998 | Maumus et al. |
| 5,876,659 A | 3/1999 | Yasutomi et al. |

(Continued)

FOREIGN PATENT DOCUMENTS

| CN | 1102632 | 5/1995 |
| CN | 101042055 | 9/2007 |

(Continued)

OTHER PUBLICATIONS

International Search Report in corresponding International Application No. PCT/FR2015/051337 dated Aug. 12, 2015 (5 pages—English Translation included).

*Primary Examiner* — Jun S Yoo
(74) *Attorney, Agent, or Firm* — Bookoff McAndrews, PLLC

(57) ABSTRACT

The invention relates to a method of fabricating a turbine engine blade out of composite material comprising fiber reinforcement densified by a matrix, the blade comprising an airfoil, a platform situated at a longitudinal end of the airfoil, and at least one functional element projecting from the outside face of the platform. The method comprises:
 making a single-piece fiber blank by multilayer weaving;
 shaping the fiber blank to obtain a single-piece fiber preform having a first portion (302) forming a preform for the blade airfoil (320) and a second portion (314) forming a preform for the platform (340) and at least one preform for a functional element (352; 354); and
 densifying the fiber preform with a matrix.
The second preform portion comprises a set of yarn layers interlinked by weaving with at least one zone of non-
(Continued)

interlinking being provided to make it possible to deploy the functional element preform relative to the first platform preform.

18 Claims, 13 Drawing Sheets

(51) Int. Cl.

| | | |
|---|---|---|
| *C04B 35/565* | (2006.01) | |
| *D03D 25/00* | (2006.01) | |
| *C04B 35/80* | (2006.01) | |
| *C04B 35/71* | (2006.01) | |
| *C08J 5/04* | (2006.01) | |
| *F01D 9/02* | (2006.01) | |
| *F04D 29/32* | (2006.01) | |
| *F04D 29/54* | (2006.01) | |
| *F01D 11/12* | (2006.01) | |

(52) U.S. Cl.
CPC ............... *C08J 5/042* (2013.01); *C08J 5/043* (2013.01); *D03D 25/005* (2013.01); *F01D 5/225* (2013.01); *F01D 5/284* (2013.01); *F01D 9/02* (2013.01); *F04D 29/324* (2013.01); *F04D 29/542* (2013.01); *C04B 2235/48* (2013.01); *C04B 2235/5244* (2013.01); *C04B 2235/5252* (2013.01); *C04B 2235/5256* (2013.01); *C04B 2235/5268* (2013.01); *C04B 2235/614* (2013.01); *C04B 2235/616* (2013.01); *C08J 2400/00* (2013.01); *F01D 11/122* (2013.01); *F05D 2220/30* (2013.01); *F05D 2230/50* (2013.01); *F05D 2240/80* (2013.01); *F05D 2300/6033* (2013.01); *F05D 2300/6034* (2013.01); *Y02T 50/60* (2013.01)

(58) Field of Classification Search
CPC .................. C04B 35/806; C04B 35/71; C04B 2235/5252; C04B 2235/5244; C04B 2235/48; C04B 2235/616; C04B 2235/614; C04B 2235/5268; C04B 2235/5256; D03D 25/005; C08J 5/042; C08J 5/043; C08J 2400/00; F04D 29/542; F04D 29/324; F05D 2240/80; F05D 2230/50; F05D 2220/30; F05D 2300/6034; F05D 2300/6033; Y02T 50/672

See application file for complete search history.

(56) References Cited

U.S. PATENT DOCUMENTS

| | | | |
|---|---|---|---|
| 9,784,113 | B2 | 10/2017 | Fremont et al. |
| 2007/0148000 | A1 | 6/2007 | Marusko et al. |
| 2009/0317246 | A1 | 12/2009 | Lutz et al. |
| 2011/0293828 | A1 | 12/2011 | Eberling-Fux et al. |
| 2011/0311368 | A1 | 12/2011 | Coupe et al. |
| 2012/0099982 | A1* | 4/2012 | Coupe ................. D03D 25/005 415/200 |
| 2012/0195766 | A1 | 8/2012 | Cohin et al. |
| 2013/0089429 | A1* | 4/2013 | Nunez ..................... B23P 15/04 416/230 |
| 2013/0108422 | A1* | 5/2013 | Coupe ................. D03D 25/005 415/182.1 |
| 2014/0205463 | A1 | 7/2014 | Herraiz et al. |
| 2014/0212292 | A1* | 7/2014 | Xu ............................ F01D 5/145 416/193 A |
| 2014/0369848 | A1 | 12/2014 | Marchal et al. |

FOREIGN PATENT DOCUMENTS

| | | |
|---|---|---|
| CN | 102803657 | 11/2012 |
| FR | 2625528 | 7/1989 |
| FR | 2 946 999 | 12/2010 |
| JP | 2003148105 | 5/2003 |
| JP | 2008202420 | 9/2008 |
| JP | 2012510418 | 5/2012 |
| JP | 2012530212 | 11/2012 |
| JP | 2013537595 | 10/2013 |
| RU | 2004130208 | 4/2006 |
| WO | WO 2006/136755 | 12/2006 |
| WO | WO 2010/061140 | 6/2010 |
| WO | WO 2011/080443 | 7/2011 |
| WO | WO 2012/156626 | 11/2012 |
| WO | WO 2013/034857 | 3/2013 |
| WO | WO 2013/089429 | 6/2013 |
| WO | WO 2013/104852 | 7/2013 |

* cited by examiner

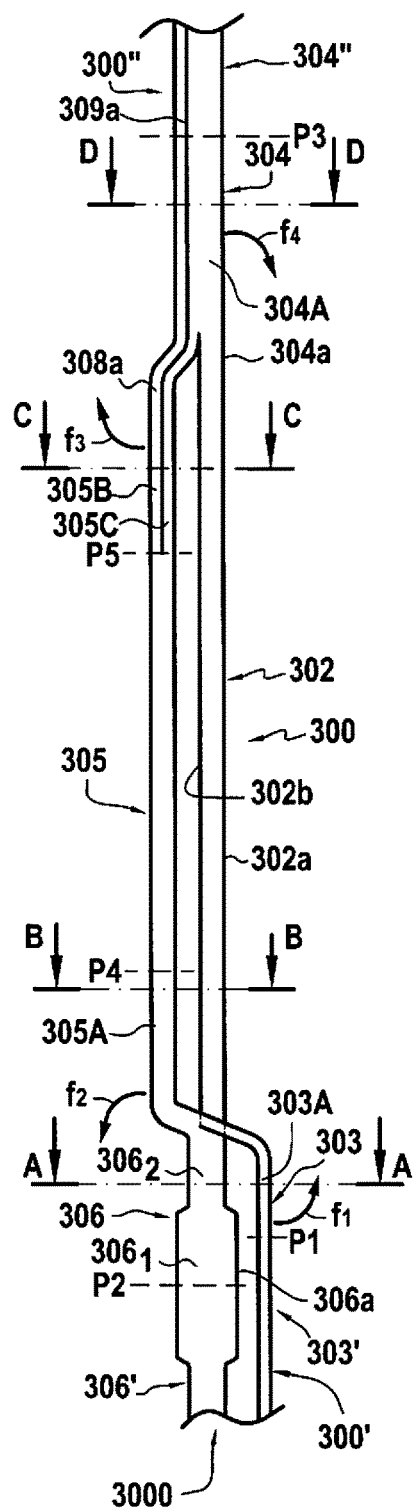
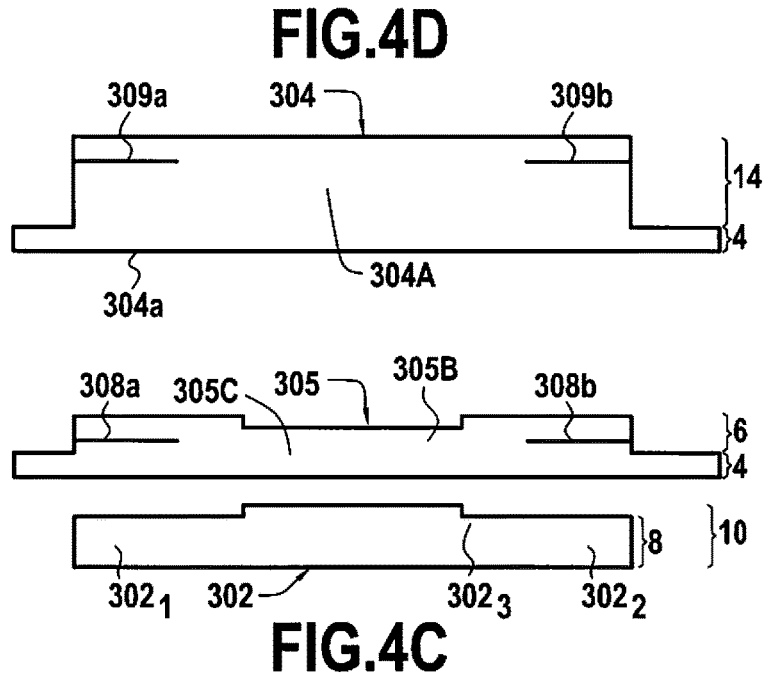
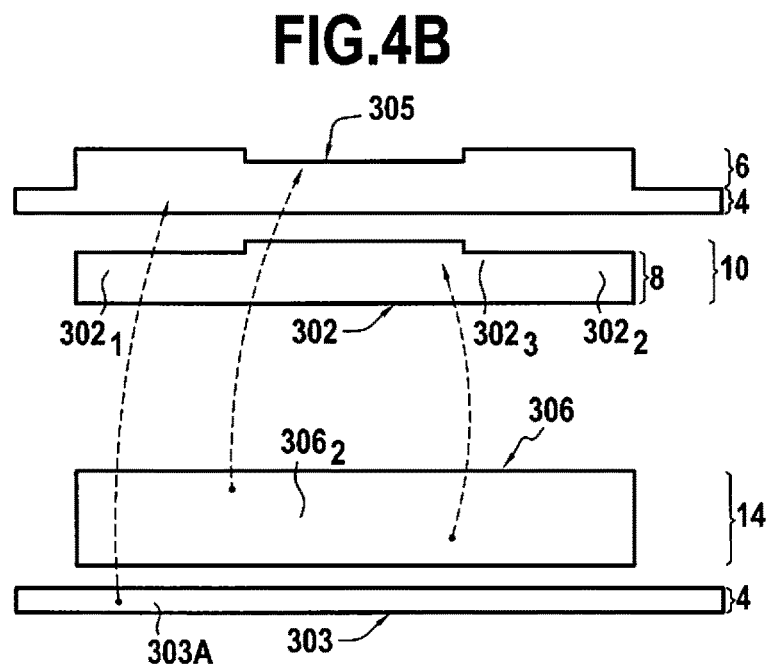

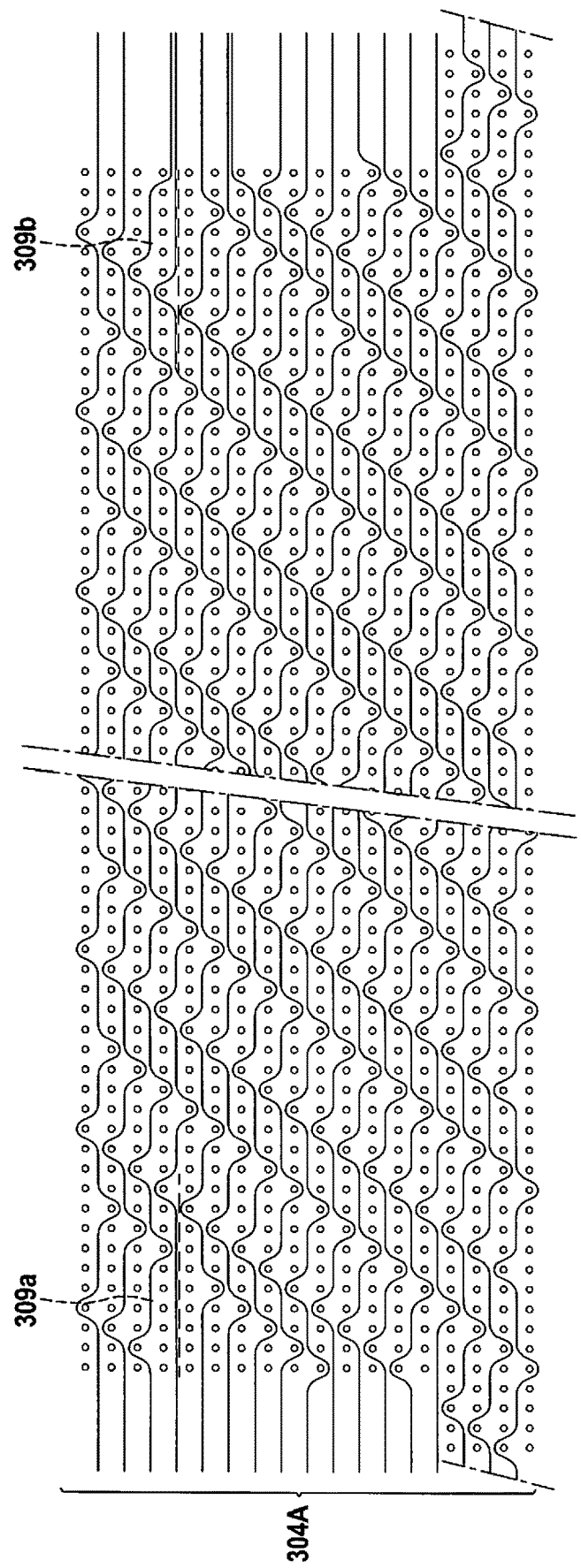

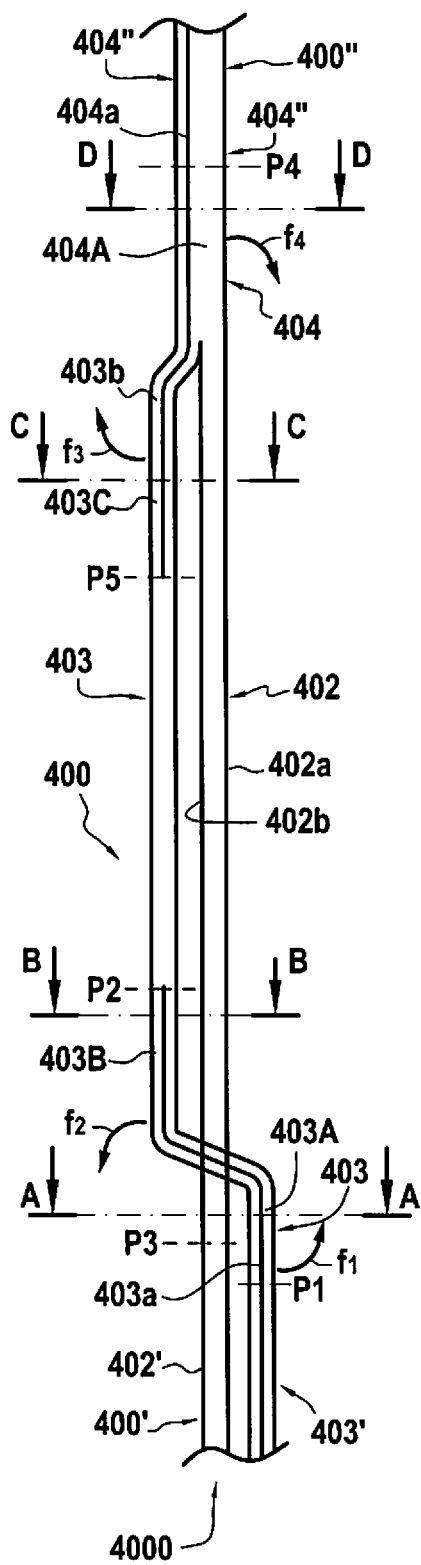
FIG.12
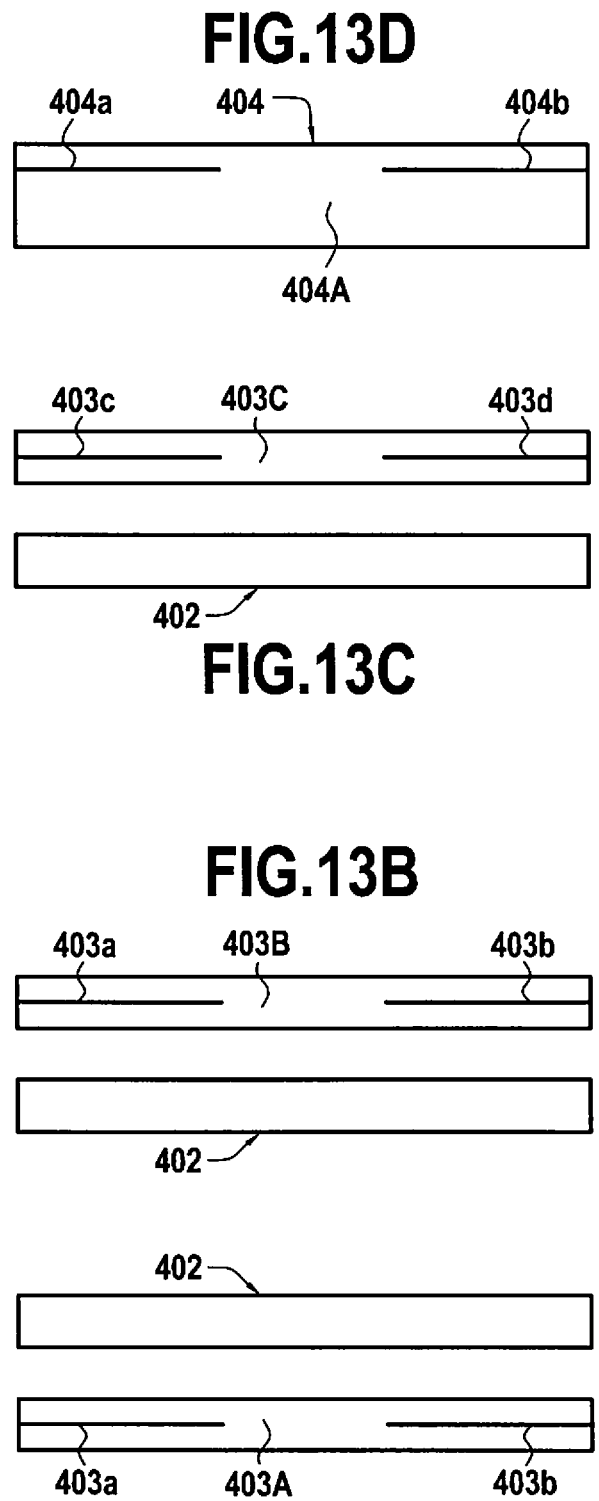
FIG.13D
FIG.13C
FIG.13B
FIG.13A

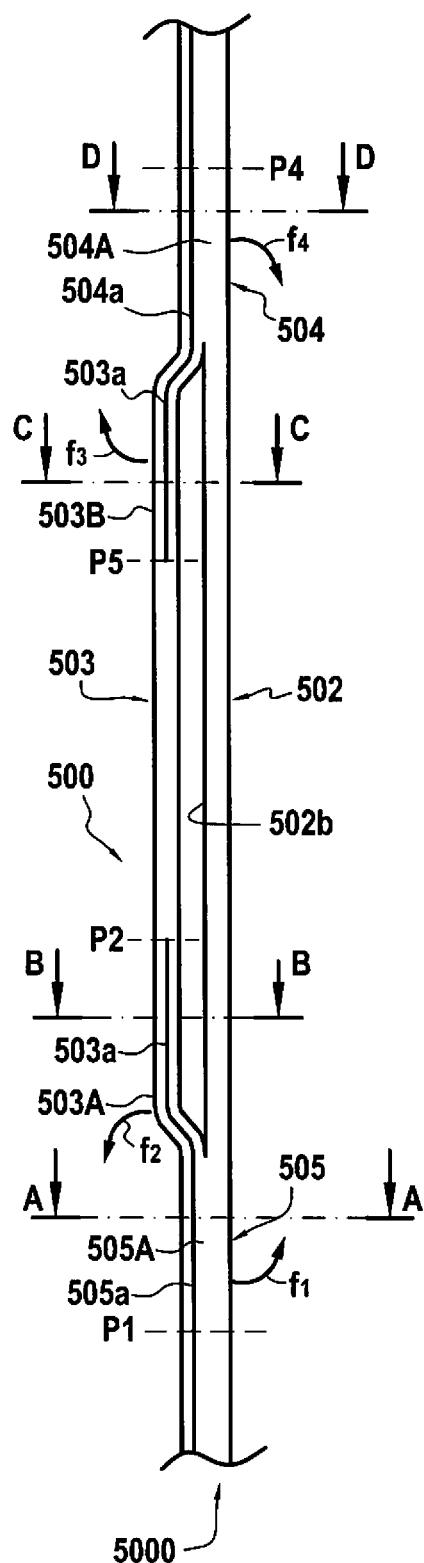
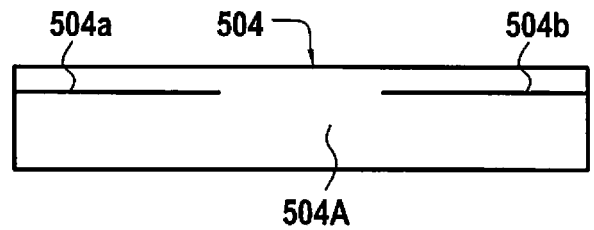
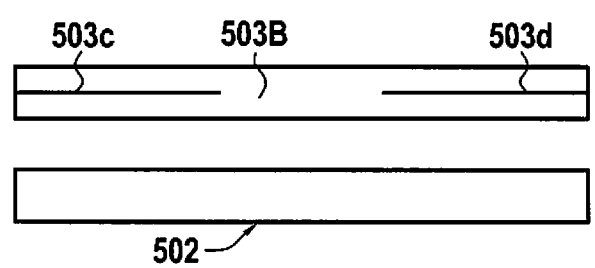
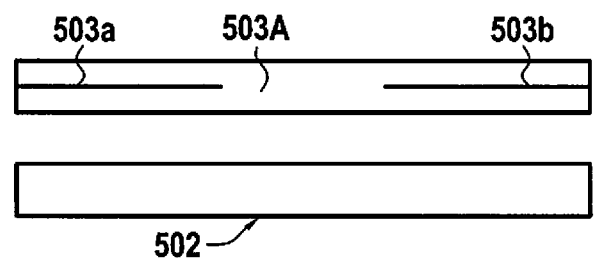
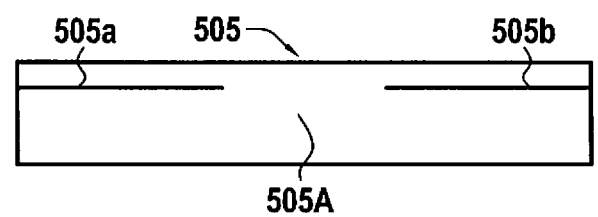

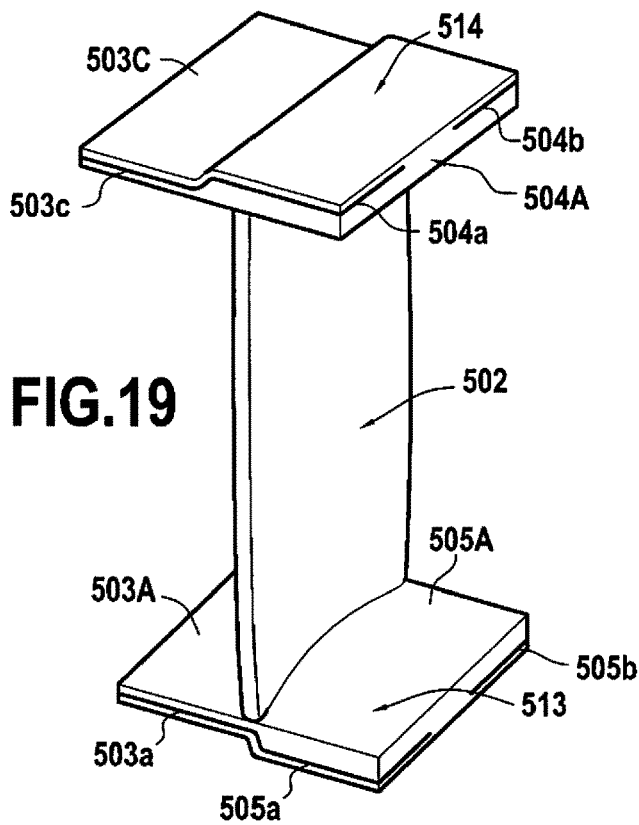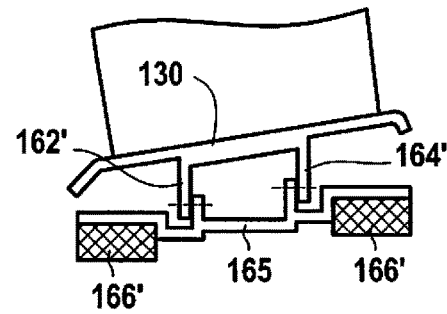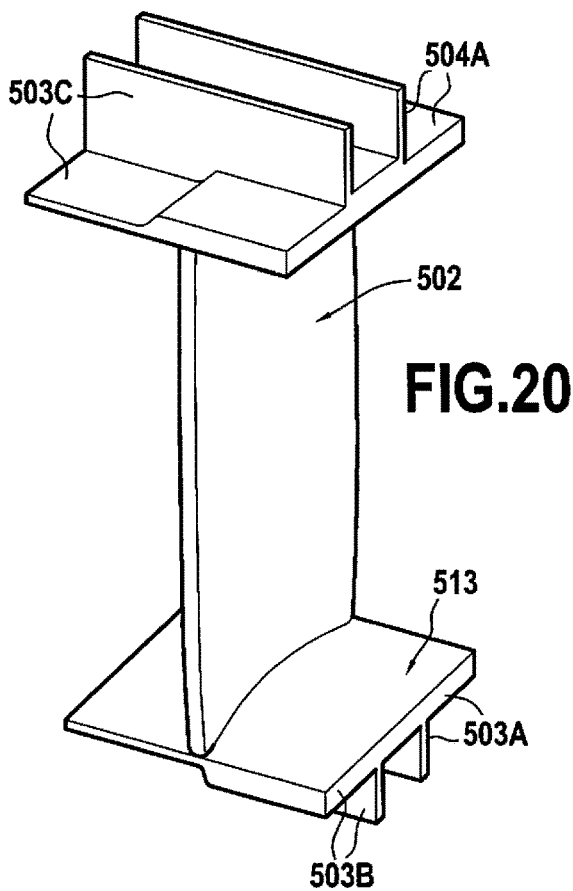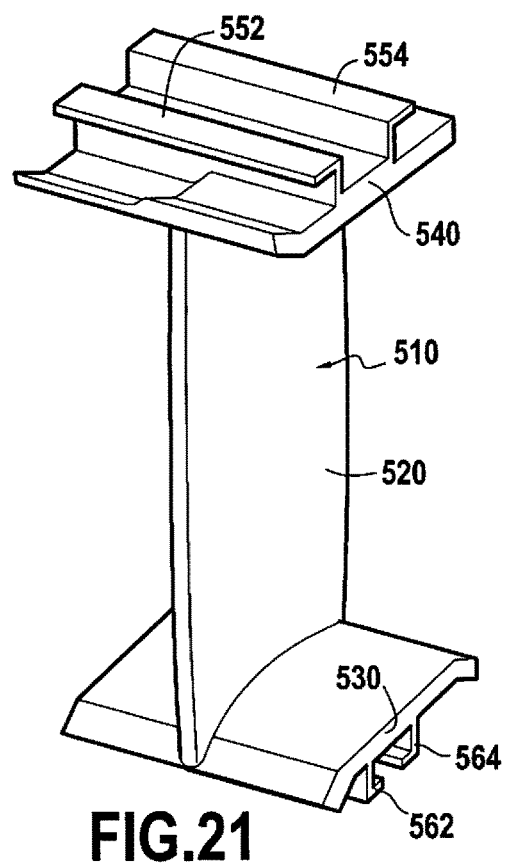

METHOD FOR MANUFACTURING A TURBINE ENGINE VANE MADE OF A COMPOSITE MATERIAL, RESULTING VANE AND TURBINE ENGINE INCLUDING SAME

CROSS-REFERENCE TO RELATED APPLICATIONS

This application is a divisional of U.S. application Ser. No. 15/312,944, filed on Nov. 21, 2016, which is the U.S. national phase entry under 35 U.S.C. § 371 of International Application No. PCT/FR2015/051337, filed on May 21, 2015, which claims priority to French Patent Application No. 1454607, filed on May 22, 2014, the entireties of which are incorporated herein by reference.

BACKGROUND OF THE INVENTION

The invention relates to turbine or compressor blades for a turbine engine, the blades being made of composite material comprising fiber reinforcement densified by a matrix.

The intended domain is that of gas turbines for aero-engines or for industrial turbines.

Proposals have already been made to make turbine engine blades out of composite material, the fiber reinforcement being obtained in particular from carbon or ceramic yarns and the matrix being made out of ceramic material or organic material or carbon.

Document WO 2010/061140 A1 describes a method of fabricating turbine rotor wheel blades out of composite material and incorporating an outer platform or head and an inner platform, by: making a fiber blank by multilayer weaving; shaping the blank by means of tooling in order to obtain a fiber preform having portions forming a preform for a blade airfoil and root, a preform for a blade head, and a preform for a blade inner platform; and then densifying the fiber preform with a matrix. The fiber blank is woven with a first portion in the form of a strip or sheet that is to form the preform for the blade airfoil and root and a second portion in the form of a strip or sheet that is to form the preform for the head and inner platform, the second portion crossing the first portion at the locations of the head and of the inner platform.

Document WO 2011/080443 A1 describes a similar method in which the fiber blank is woven with a first portion in the form of a strip or sheet that is to form a preform for a blade airfoil and root, a second portion in the form of a strip or sheet that is to form a preform for overlapping spoilers of the blade head, and a third portion in the form of a strip or sheet that is to form a preform for wipers of the blade head and a preform for a blade inner platform, the second and third portions crossing the first portion at the locations of the head and of the inner platform. Such a method is relatively complex to implement. In addition, making a woven fiber blank with two crossings leads to large amounts of stress on the yarns, which can lead to yarns breaking, in particular if they are made of carbon or ceramic.

Document US 2012/099982 discloses fabricating a turbine engine stator blade out of composite material with fiber reinforcement densified by a matrix and comprising an airfoil, a first platform situated at one longitudinal end of the airfoil, and at least one functional element extending from the outside face of the first platform.

OBJECT AND SUMMARY OF THE INVENTION

An object of the invention is to propose a simplified method for fabricating a turbine engine blade out of composite material as a single piece while limiting the stresses imposed on the yarns during the weaving of a fiber blank from which a preform of the blade is obtained.

In general manner, the invention provides a method of fabricating a turbine engine blade out of composite material comprising fiber reinforcement densified by a matrix, the blade comprising an airfoil, a first platform situated at one longitudinal end of the airfoil and having an inside face defining a flow passage and an outside face opposite from the inside face, and at least one functional element projecting from the outside face of the first platform and connecting with said outside face in a direction that is substantially circumferential, the method comprising:
  making a single-piece fiber blank by multilayer weaving;
  shaping the fiber blank to obtain a single-piece fiber preform having a first portion forming a preform for the blade airfoil and a second portion forming a preform for the first platform and a preform for at least one functional element; and
  densifying the fiber preform with a matrix in order to obtain a composite material blade having fiber reinforcement formed by the preform and densified by the matrix and forming a single piece incorporating the airfoil, the first platform, and said at least one functional element;
  in which method the second portion of the preform comprises a set of yarn layers interlinked by weaving with at least one non-interlinked zone being arranged therein enabling the or each functional element preform to be deployed relative to the preform for the first platform. The fiber blank portion corresponding to the second preform portion may include one or more yarn layers taken from the portion of the fiber blank corresponding to the airfoil preform at one or more locations positioned in the longitudinal direction, the airfoil preform being of varying thickness in the longitudinal direction.

The term "functional element" is used herein to mean a portion of a blade that projects from the outside surface of a platform, e.g. to form a wiper of an outer platform or "head" of a rotor blade, or a mounting hook projecting from the outside face of an outer platform or possibly of an inner platform of a stator blade, or indeed an abradable support element projecting from the outside face of an inner platform or possibly of an outer platform of a stator blade. The term "an inside face defining a flow passage" is used herein to mean the face of an inner or outer blade platform that, when the blade is inserted in a compressor or a turbine, is the face that is exposed to the stream of air or gas flowing through the compressor or the turbine. The terms "inner" and "outer" are used herein to designate the situation relative to the axis of the turbine engine on which the blade is mounted, the inner platform being closer to the axis than the outer platform, for example. The term "circumferential" is used herein relative to the axis of the turbine engine in which the blade is mounted.

With the method of the invention, the way the non-interlinked zones are arranged means that it is not necessary to make the fiber blank with separate woven sheets in order to obtain both a preform for a functional element and also a preform for a blade platform. Compared with the above-mentioned prior art, the number of crossings and the complexity of the fiber blank are thus reduced, thereby reducing the risk of breaking yarns, and simplifying the design of tooling for shaping the preform.

The set of layers of the second preform portion may include a group of yarn layers in common with the airfoil preform.

The portion of the fiber blank corresponding to the second preform portion may in part extend the portion of the blank corresponding to the airfoil preform, thereby avoiding the need for this portion to be crossed completely as in the above-mentioned prior art.

The shaping of the fiber preform may be performed so as to obtain a single-piece fiber preform also having a third portion forming a preform for a second platform situated at a longitudinal end of the airfoil remote from its end where the first platform is located, and the set of yarn layers of the fiber blank portion corresponding to the second preform portion may then include a group of yarn layers in common with the portion of the fiber blank corresponding to the airfoil preform and a group of yarn layers in common with the blank portion corresponding to the second platform preform.

In a first implementation of the invention, the method seeks to fabricate a turbine engine rotor blade, the blade being made of composite material comprising fiber reinforcement densified by a matrix and comprising a root, an airfoil, an outer platform forming a head situated at one longitudinal end of the airfoil and having an inside face defining a flow passage and an outside face opposite from the inside face, and head wipers each projecting from the outside face of the head and connecting with said outside face in a direction that is substantially circumferential, the method comprising:

making a single-piece fiber blank by multilayer weaving;
  shaping the fiber blank to obtain a single-piece fiber preform having a first portion forming a preform for the airfoil, a second portion forming a preform for the head and preforms for the wipers, and a third portion extending the first portion and forming a preform for the root; and
  densifying the fiber preform with a matrix in order to obtain a composite material blade having fiber reinforcement formed by the preform and densified by the matrix and forming a single piece incorporating the root, the airfoil, the head, and the head wipers;
  in which method the second portion of the preform comprises a set of yarn layers interlinked by weaving with non-interlinked zones being arranged therein enabling the preforms for the head wipers to be deployed relative to the preform for the head. The fiber blank portion corresponding to the second preform portion may include one or more yarn layers taken from the portion of the fiber blank corresponding to the airfoil preform at one or more locations positioned in the longitudinal direction, the airfoil preform being of varying thickness in the longitudinal direction.

The set of layers of the second preform portion may include a group of yarn layers in common with the blade preform. The set of layers of the second preform portion may also include a group of additional yarn layers that are not in common with the blade airfoil preform.

The shaping of the fiber preform may be performed so as to obtain a single-piece fiber preform also having a fourth portion forming a preform for an inner platform. Under such circumstances, the set of yarn layers of the fiber blank portion corresponding to the second preform portion may include a group of yarn layers in common with the portion of the fiber blank corresponding to the airfoil preform and a group of yarn layers in common with the blank portion corresponding to the inner platform preform. Still under such circumstances, the preform may include a set of yarn layers in common with the root preform and crossed by a set of yarn layers of the inner platform preform at the location of the inner platform.

The root preform may comprise a number of yarn layers that is greater than the number of yarn layers of the airfoil preform, and, in the fiber blank, the set of yarn layers of the portion of the blank corresponding to the second preform portion includes a group of yarn layers in common with the portion of the blank corresponding to the airfoil preform, and a group of yarn layers in common with the portion of the blank corresponding to the root preform and not used in the airfoil preform. A group of yarn layers used in the portion of the blank corresponding to the root preform is thus recovered from the portion of the blank corresponding to the second preform portion. The set of layers of the second preform portion may also include an additional group of yarn layers not in common with the root preform.

In a second implementation of the invention, the method seeks to fabricate a turbine engine stator blade, the blade being made of composite material comprising fiber reinforcement densified by a matrix and comprising an airfoil, a first platform situated at one longitudinal end of the airfoil and having an inside face defining a flow passage and an outside face opposite from the inside face, and mounting hooks projecting from the outside face of the first platform and connecting with said outside face in a direction that is substantially circumferential, the method comprising:

making a single-piece fiber blank by multilayer weaving;
  shaping the fiber blank to obtain a single-piece fiber preform having a first portion forming a preform for the airfoil, a second portion forming a preform for the first platform, and preforms for the mounting hooks; and
  densifying the fiber preform with a matrix in order to obtain a composite material blade having fiber reinforcement formed by the preform and densified by the matrix and forming a single piece incorporating the airfoil, the first platform, and the mounting hooks;
  in which method the second portion of the preform comprises a set of yarn layers interlinked by weaving with non-interlinked zones being arranged therein enabling the mounting hook preforms to be deployed relative to the preform for the first platform. The fiber blank portion corresponding to the second preform portion may include one or more yarn layers taken from the portion of the fiber blank corresponding to the airfoil preform at one or more locations positioned in the longitudinal direction, the airfoil preform being of varying thickness in the longitudinal direction.

The preform of the first platform may be an outer platform preform or an inner platform preform.

The set of layers of the second preform portion may include a group of yarn layers in common with the airfoil preform.

In a third implementation of the method of the invention, the invention provides a method of fabricating a turbine engine stator blade, the blade being made of composite material comprising fiber reinforcement densified by a matrix and comprising an airfoil, a first platform situated at one longitudinal end of the airfoil and having an inside face defining a flow passage and an outside face opposite from the inside face, and at least one abradable support element projecting from the outside face of the first platform and connecting with said outside face in a direction that is substantially circumferential, the method comprising:

making a single-piece fiber blank by multilayer weaving;
  shaping the fiber blank to obtain a single-piece fiber preform having a first portion forming a preform for the airfoil, a second portion forming a preform for the first platform, and at least one preform for an abradable support element; and densifying the fiber preform with a matrix in order to obtain a composite material blade having fiber reinforcement formed by the preform and densified by the matrix and forming a single piece incorporating the airfoil, the first platform, and at least one abradable support element;

in which method the second portion of the preform comprises a set of yarn layers interlinked by weaving with non-interlinked zones being arranged therein enabling the or each abradable support element preform to be deployed relative to the preform for the first platform. The fiber blank portion corresponding to the second preform portion may include one or more yarn layers taken from the portion of the fiber blank corresponding to the airfoil preform at one or more locations positioned in the longitudinal direction, the airfoil preform being of varying thickness in the longitudinal direction.

The first platform preform may be an inner platform preform or an outer platform preform.

The set of layers of the second preform portion may include a group of yarn layers in common with the airfoil preform.

The first and second implementations of the method of the invention may be combined with each other in order to fabricate a turbine engine stator blade out of composite material incorporating a blade, an outer platform, mounting hooks, an inner platform, and at least one abradable support element.

In any method of the invention, in the fiber blank, said set of yarn layers may comprise warp yarn layers running in the longitudinal direction of the blade, and said non-interlinked zones then run continuously in the warp direction between opposite sides of the fiber blank portion corresponding to the second preform portion over a distance that is limited in the weft direction.

In any method of the invention, in the fiber blank, said set of yarn layers may comprise weft yarn layers running in the longitudinal direction of the blade, and said non-interlinked zones then run continuously in the weft direction between opposite sides of the fiber blank portion corresponding to the second preform portion over a distance that is limited in the warp direction.

The invention also provides a turbine engine blade comprising an airfoil, a first platform situated at a longitudinal end of the airfoil and having an inside face defining a flow passage and an outside face opposite from the inside face, and at least one functional element extending from the outside face of the first platform and connecting with said outside face in a direction that is substantially circumferential;

the blade being a single piece of composite material comprising multilayer woven fiber reinforcement densified by a matrix; and the fiber reinforcement being a single piece with a first portion forming reinforcement for a blade airfoil and a second portion forming reinforcement for a first blade platform and for at least one functional element;

in which blade the second fiber reinforcement portion comprises a set of yarn layers all interlinked by weaving, apart from in a separation zone between the reinforcement for the or each functional element and the reinforcement for the first platform.

In a first particular embodiment of a blade of the invention, the blade is a turbine engine rotor blade comprising an airfoil, an outer platform forming a blade head situated at a longitudinal end of the airfoil and having an inside face defining a flow passage and an outside face opposite from the inside face, and head wipers extending from the outside face of the head and connecting with said outside face in a direction that is substantially circumferential;

the blade being a single piece of composite material comprising multilayer woven fiber reinforcement densified by a matrix; and the fiber reinforcement being a single piece with a first portion forming reinforcement for the airfoil and a second portion forming reinforcement for the head and reinforcement for the head wipers;

in which blade the second fiber reinforcement portion comprises a set of yarn layers all interlinked by weaving, apart from in separation zones between the reinforcement for the head wipers and the reinforcement for the head.

In a second particular implementation of the blade of the invention, the blade is a turbine engine stator blade comprising an airfoil, a first platform situated at a longitudinal end of the airfoil and having an inside face defining a flow passage and an outside face opposite from the inside face, and blade mounting hooks extending from the outside face of the first platform and connecting with said outside face in a direction that is substantially circumferential;

the blade being a single piece of composite material comprising multilayer woven fiber reinforcement densified by a matrix; and the fiber reinforcement being a single piece with a first portion forming reinforcement for the airfoil and a second portion forming reinforcement for the first platform and reinforcement for the mounting hooks;

in which blade the second fiber reinforcement portion comprises a set of yarn layers all interlinked by weaving, apart from in separation zones between the reinforcement for the mounting hooks and the reinforcement for the first platform.

The first platform may be an outer platform or an inner platform.

In a third particular embodiment of a blade of the invention, the blade may be a turbine engine stator blade comprising an airfoil, a first platform situated at a longitudinal end of the airfoil and having an inside face defining a flow passage and an outside face opposite from the inside face, and at least one abradable support element extending from the outside face of the first platform and connecting with said outside face in a direction that is substantially circumferential;

the blade being a single piece of composite material comprising multilayer woven fiber reinforcement densified by a matrix; and the fiber reinforcement being a single piece with a first portion forming reinforcement for the airfoil and a second portion forming reinforcement for the first blade platform and reinforcement for at least one abradable support element;

in which blade the second fiber reinforcement portion comprises a set of yarn layers all interlinked by weaving, apart from in separation zones between the reinforcement for the or each abradable support element and the reinforcement for the first platform.

The first platform may be an inner platform or an outer platform. The second and third embodiments of a blade of the invention may be combined with each other to form a turbine engine stator blade made out of composite material incorporating a blade, an outer platform, mounting hooks, an inner platform, and at least one abradable support element.

In all embodiments of a blade of the invention, the set of yarn layers of the second reinforcement portion may include a group of yarn layers in common with the airfoil reinforcement.

The invention also provides a turbine or compressor wheel for a turbine engine including blades as defined above made out of ceramic matrix composite material, or a turbine engine compressor wheel including blades as defined above made out of organic matrix composite material, and also a turbine engine having at least one such turbine or compressor wheel.

BRIEF DESCRIPTION OF THE DRAWINGS

The invention can be better understood on reading the following description given by way of non-limiting indication and with reference to the accompanying drawings, in which:

FIG. 3 is a highly diagrammatic view in side elevation of an example arrangement of sets of yarn layers in a fiber blank made by multilayer weaving in order to obtain a fiber preform for a blade of the type shown in FIG. 2;

FIGS. 4A, 4B, 4C, and 4D are section views on a larger scale on planes A, B, C, and D of FIG. 3;

FIGS. 5A, 5B, 5C, and 5D are fragmentary views corresponding to FIGS. 4A, 4B, 4C, and 4D respectively, showing diagrammatically one way of weaving the FIG. 3 fiber blank;

FIG. 12 is a highly diagrammatic side elevation view showing an arrangement of sets of yarn layers in a fiber blank made by multilayer weaving for the purpose of obtaining a fiber preform for a stator wheel blade of the type shown in FIG. 1;

FIGS. 13A, 13B, 13C, and 13D are section views on a larger scale on planes A, B, C, and D of FIG. 12;

FIG. 17 is a highly diagrammatic side elevation view of an arrangement of sets of yarn layers in a fiber blank made by multilayer weaving for the purpose of obtaining a fiber preform for a stator wheel blade of the type shown in FIG. 1;

FIGS. 18A, 18B, 18C, and 18D are section views on a larger scale on planes A, B, C, and D of FIG. 17;

FIGS. 19 to 21 show successive steps in making a fiber preform for a stator wheel blade from the FIG. 17 blank; and FIG. 22 is a fragmentary diagrammatic view showing a variant embodiment of a turbine engine stator wheel blade in accordance with the invention.

DETAILED DESCRIPTION OF EMBODIMENTS

The invention is applicable to various types of turbine engine blade, in particular to rotor wheel blades and to stator wheel blades for a turbine or a compressor in various spools of a gas turbine. The term turbine or compressor "stator wheel" is used herein to mean a set of non-rotary blades forming a nozzle of a turbine or a set of guide vanes of a compressor.

Embodiment: Rotor Wheel Blade for a Low Pressure Turbine

Figures 1, 2:
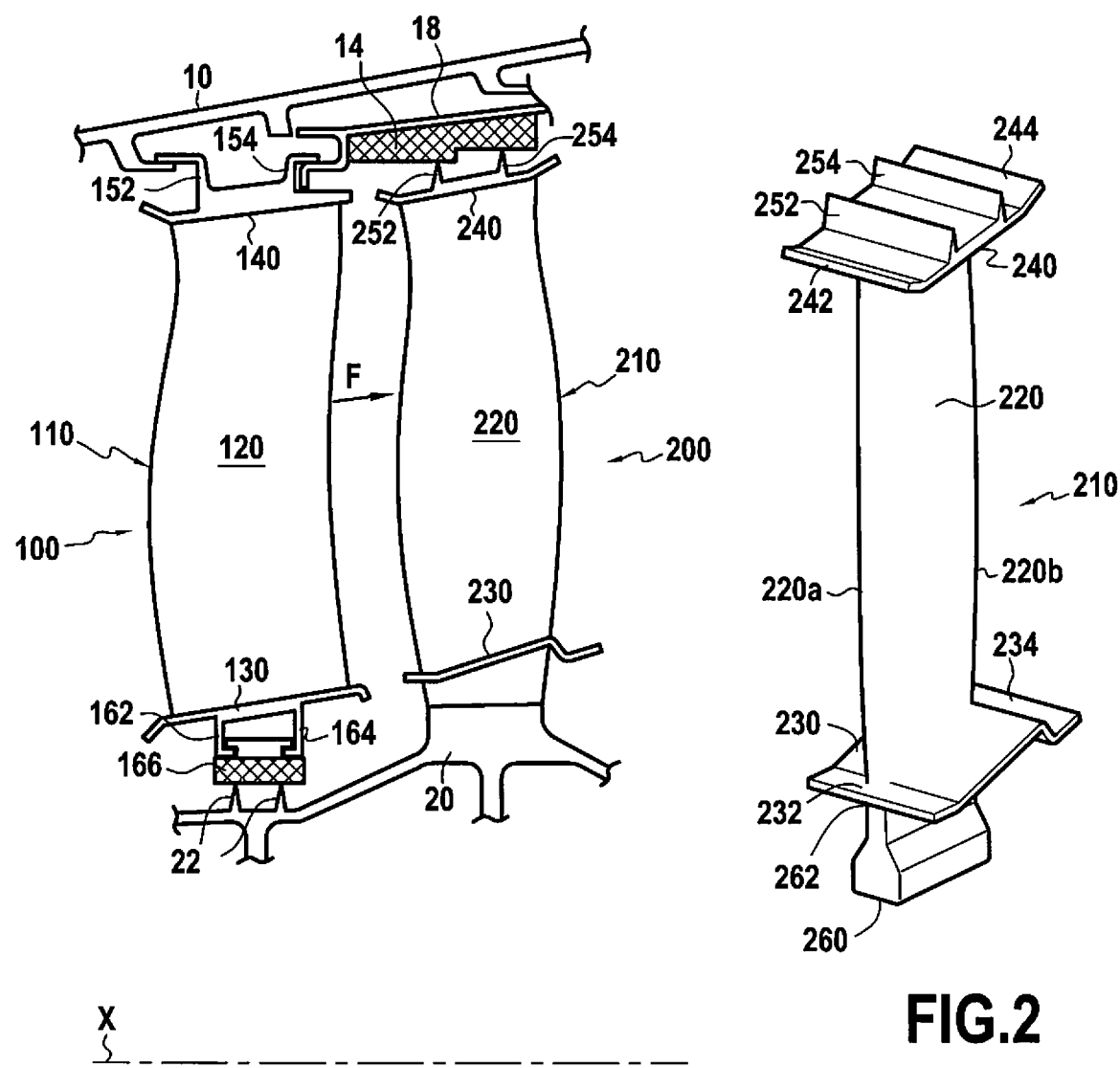
FIG. 1 is a highly diagrammatic fragmentary section view of a portion of a low pressure turbine in a turbine engine.
FIG. 2 is a highly diagrammatic perspective view of a blade of a rotor wheel of the FIG. 1 turbine.

The low pressure turbine shown very diagrammatically and in part in FIG. 1 comprises a plurality of stator wheels 100 alternating with a plurality of rotor wheels 200 in the direction of the axis X of the turbine, with the figure showing only a single pair comprising only a stator wheel and a rotor wheel.

A stator wheel 100 comprises a plurality of stator blades or "vanes" 110, each having an airfoil 120 extending between an inner platform 130 and an outer platform 140. Support elements 162, 164 project inwards from the outside face of the inner platform 130 and connect with this outside face along connection zones extending in a substantially circumferential direction. The support elements 162 and 164 have an L-shaped profile and they support a block of abradable material 166. Mounting hooks 152 and 154 project outwards from the outside face of the outer platform 140 and connect with this outside face along connection zones that extend in a substantially circumferential direction. The hooks 152 and 154 enable the blade to be assembled in a turbine casing 10.

A rotor wheel 200 comprises a plurality of blades 210 (FIGS. 1 and 2), each having an airfoil 220 extending in a longitudinal direction between an inner platform 230 and an outer platform or "head" 240. A root 260 formed by a portion of greater thickness, e.g. having a bulb-shaped section, is connected by a tang 262 to the outside face of the inner platform 230. Head wipers 252 and 254 project outwards from the outside surface of the head 240 and connect with the outside face along connection zones extending in a substantially circumferential direction.

The outside faces of the platforms 130 and 230, and the inside faces of the platform 140 and of the head 240 define a flow passage for the gas stream flowing through the turbine.

Each blade 210 is mounted on a turbine rotor 20 by its root 260 engaging in a housing of complementary shape formed at the periphery of the rotor. In its upstream and downstream end portions (upstream and downstream in the flow direction S of the gas stream), the platform 230 is terminated by upstream and downstream spoilers 232 and 234. In cross-section, the airfoil 220 presents a curved profile of thickness that varies between its leading edge 220a and its trailing edge 220b. The thickness of the airfoil may also vary in the longitudinal direction. The upstream and downstream head wipers 252 and 254 have tooth-shaped profiles with tips that can penetrate into a layer of abradable material 14 carried by a turbine ring 18 in order to reduce clearance between the blade tip and the turbine ring. In its upstream and downstream end portions, the head 240 may likewise terminate in upstream and downstream spoilers 242 and 244. The turbine rotor carries wipers 22 having ends that can penetrate into the abradable material 166 in order to seal the flow passage for the gas stream on the inside.

An arrangement for a low pressure turbine engine turbine as described briefly above is itself known.

FIGS. 3 and 4A to 4D show very diagrammatically a fiber blank 300 from which a fiber preform for a blade can be shaped so that, after densification by a matrix and possibly after machining, a blade is obtained that is made out of composite material, and that is of the type shown in FIG. 2, incorporating an airfoil, a root, an inner platform, a head, and head wipers.

In this embodiment, as in all of the other embodiments described below, the fiber blank is made by three-dimensional or multilayer weaving, and only the outlines of the various woven portions of the blank are shown for reasons of clarity (except in FIGS. 5A to 5D). By way of example, the weaving is performed with the warp direction corresponding to the longitudinal direction of the blade that is to be made, each blank portion comprising a plurality of warp yarn layers interlinked at least in part by weft yarns in a plurality of weft yarn layers.

The blank 300 comprises a portion 302 that is to form the preform for the airfoil of the blade that is to be made. The portion 302 may present smaller thickness in its lateral portions $302_1$, $302_2$ adjacent to the leading and trailing edges of the airfoil of the blade that is to be made than in its central portion $302_3$, with the difference in thickness being obtained in this example by having a different number of layers of warp yarns.

The blank 300 also has a portion 306 with a segment $306_1$ that is to form the preform for the root of the blade that is to be made and a segment $306_2$ that is to form the preform for the tang form of the blade that is to be made. The portion 302 lies in continuity with the segment $306_2$ of the portion 306 and shares common warp yarn layers therewith. Nevertheless, in this example, the portion $306_2$ has thickness that is greater than the thickness of the portion $302_3$, this extra thickness being obtained by a greater number of layers of warp yarns, such that some of the layers of warp yarns in the portion 306 are not to be found in the portion 302. The segment $306_1$ presents thickness that is greater than the thickness of the segment $306_2$ so as to present a shape corresponding to the shape of the bulb of the root of the blade that is to be made. This greater thickness may be obtained by increasing the weight and/or the thread count of the weft yarns. In a variant or in addition, an insert may be inserted locally during weaving. For a more detailed description of making a fiber blank portion corresponding to a blade root preform, reference may be made by example to the above-mentioned Document WO 2010/061140 A1.

The blank 300 also has a portion 303 that extends along a face 306a of the portion 306 without being interlinked with the portion 306. The warp yarns of the warp yarn layers of the portion 303 pass through the portion 302 where it connects with the portion 306. The excess warp yarn layers of the portion 306, i.e. those that are not taken up in the portion 302 are united by weaving with the layers of the portion 303 after it has passed through the portion 302, in order to form a portion 305. The portion 305 extends along the face 302b of the portion 302 that is opposite from the face 302a corresponding to the face 306a of the portion 306. The portion 305 is not interlinked by weaving with the portion 302 on its path running along it.

At the end of the portion 302 remote from its end that is connected to the portion 306, a portion 304 is formed extending the portions 302 and 305, while uniting them by weaving, at least some of the layers of yarns of the portion 305 possibly being found beside the face 304a of the portion 304 that corresponds to the face 302a of the portion 302.

A segment 303A of the portion 303 running along the face 306a of the portion 306 and a segment 305A of the portion 305 extending the segment 303A and running along the face 302b of the portion 302 are for use in forming the preform for the inner platform of the blade to be made.

In its terminal portion prior to connection with the portion 304, the portion 305 presents adjacent segments 305B and 305C that are to form part of the head preform and of the preforms for the head wipers of the blade that is to be made. The segments 305B and 305C are interlinked only in their central portion in order to provide non-interlinked zones 308a and 308b that run in the warp direction all along their upstream and downstream edges and in the weft direction over a limited distance from each of these edges (FIGS. 3 and 4C).

The portion constituting preforms for the head and the head wipers of the blade that is to be made, which is complementary to the portion formed by the segments 305B and 305C, comes from a segment 304A of the portion 304 situated extending the segments 305A and 305B of the portion 302. During weaving, non-interlinked zones 309a and 309b are provided in the segment 304A all along the segment in the warp direction and over a limited distance from each of its upstream and downstream edges in the weft direction (FIG. 4D). The non-interlinked zones 308a and 309a lie in continuity with each other, as do the non-interlinked zones 308b and 309b. As described below, the non-interlinked zones 308a, 308b, 309a, and 309b are used for deploying the preforms for the head wipers of the blade that is to be made.

In the section views 4A and 4B, arrows indicate the correspondences between the sets of warp yarn layers situated initially in the portions 303 and 306, and subsequently in the portions 302 and 305. In the fiber blank, the total number of warp yarn layers is equal to 18 in this example. The numbers next to braces in FIGS. 4A to 4D give an example of how warp yarn layers can be distributed between the various portions of the fiber blank. Thus, in this example, the portion 303 has four layers, the portion 306 has 14 layers, and the portion 302 has eight layers in its lateral portions $302_2$ and $302_2$, and ten layers in its central portion $302_3$. Naturally, the total number of warp yarn layers and the way they are distributed could be different, and the numbers given in the example shown are merely for the purpose of facilitating understanding.

FIGS. 5A to 5D show weave planes at different levels in the fiber blank 300. In FIGS. 5A to 5D, the yarns in section are warp yarns, and it is the platforms of the weft yarns that are shown. In the example shown, the weaving is multilayer or three-dimensional weaving performed using a satin or multi-satin type weave. Other types of multilayer weaving could be used, e.g. multilayer weaving with a multi-plain weave or weaving with an interlock weave. The term "interlock" weave is used herein to mean a weave in which each layer of weft yarns interlinks a plurality of layers of warp yarns with all of the yarns in a given weft column having the same movement in the weave plane. Various kinds of multilayer weaving are described in particular in Document WO 2006/136755.

For the presently-envisaged application to a low pressure turbine blade, the yarns used for weaving are made of refractory material, in particular of ceramic material, such as for example yarns based on silicon carbide (SiC) supplied under the name "Nicalon" by the Japanese supplier Nippon Carbon.

Figure 5A:
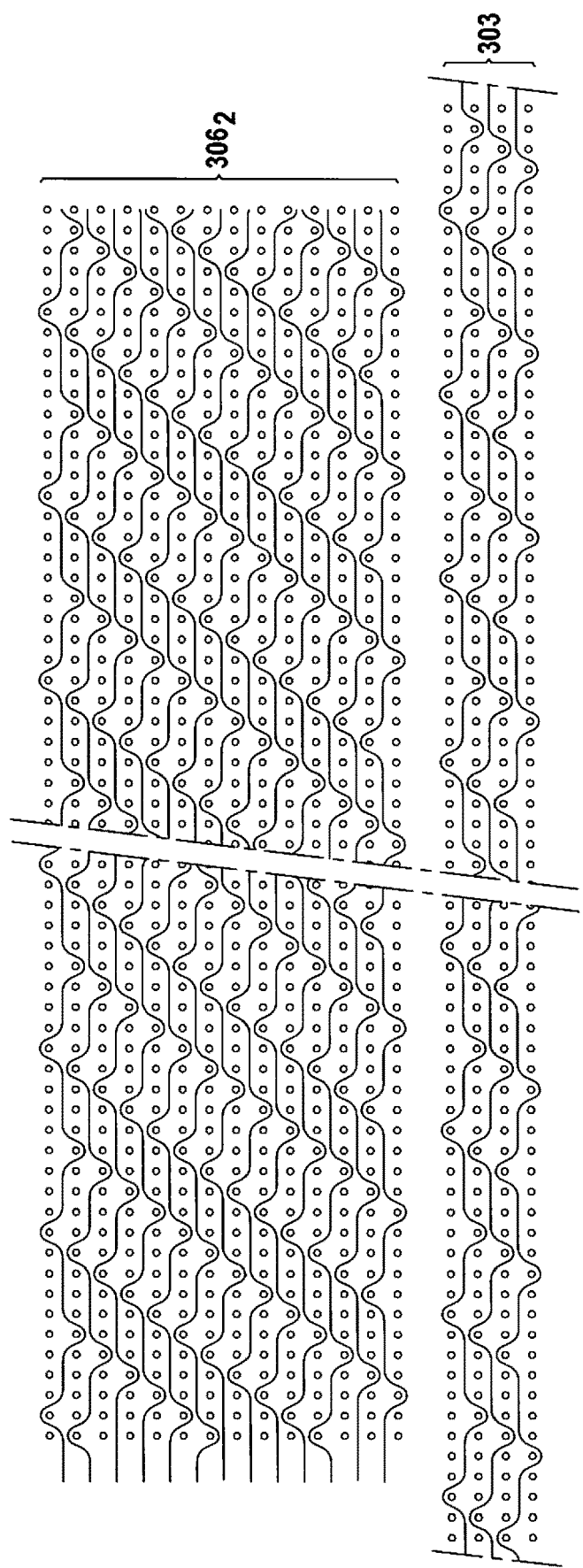

FIG. 5A, which corresponds to FIG. 4A, shows a weave plane of the portions 306 and $306_2$.

Figure 5B:
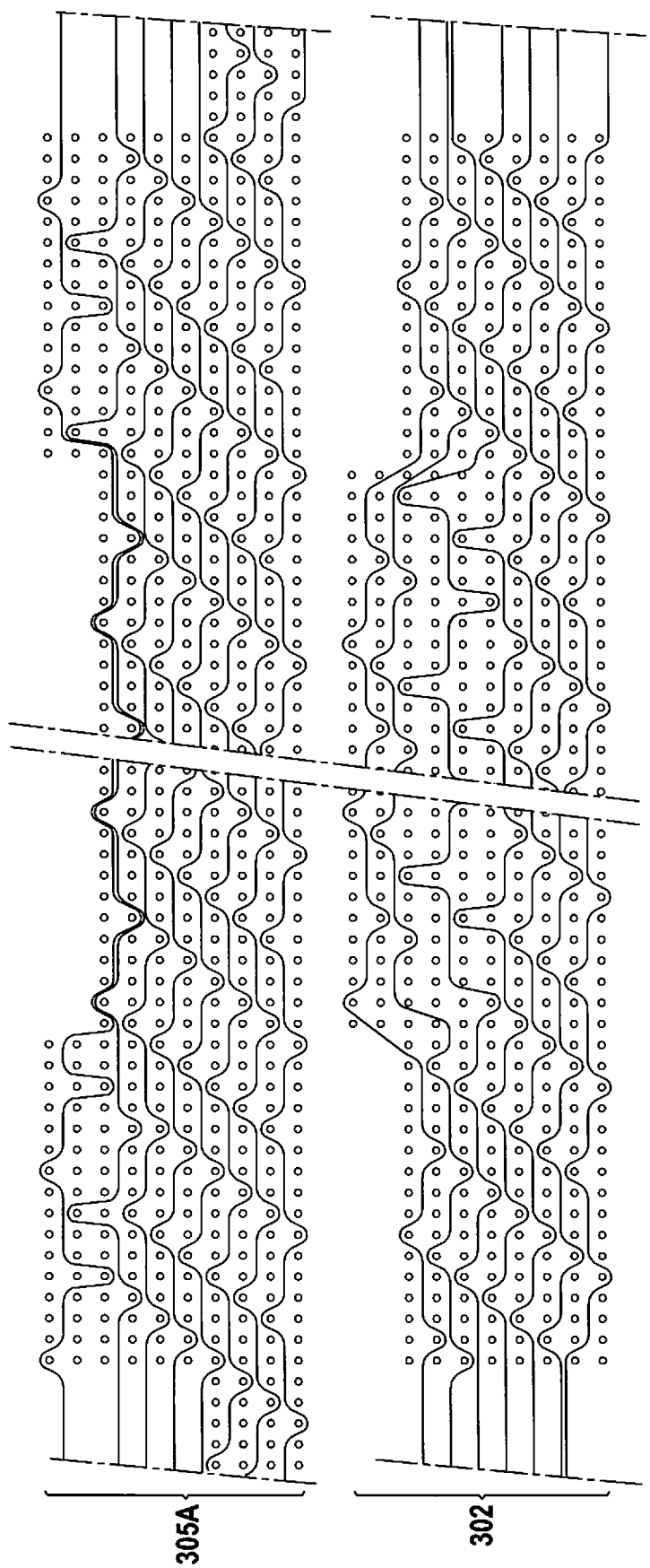

FIG. 5B, which corresponds to FIG. 4B, shows a weave plane of the portions 302 and 305 in the vicinity of the connection of the portion 302 with the portion 306, i.e. in the segment 305A for the portion 305.

Figure 5C:
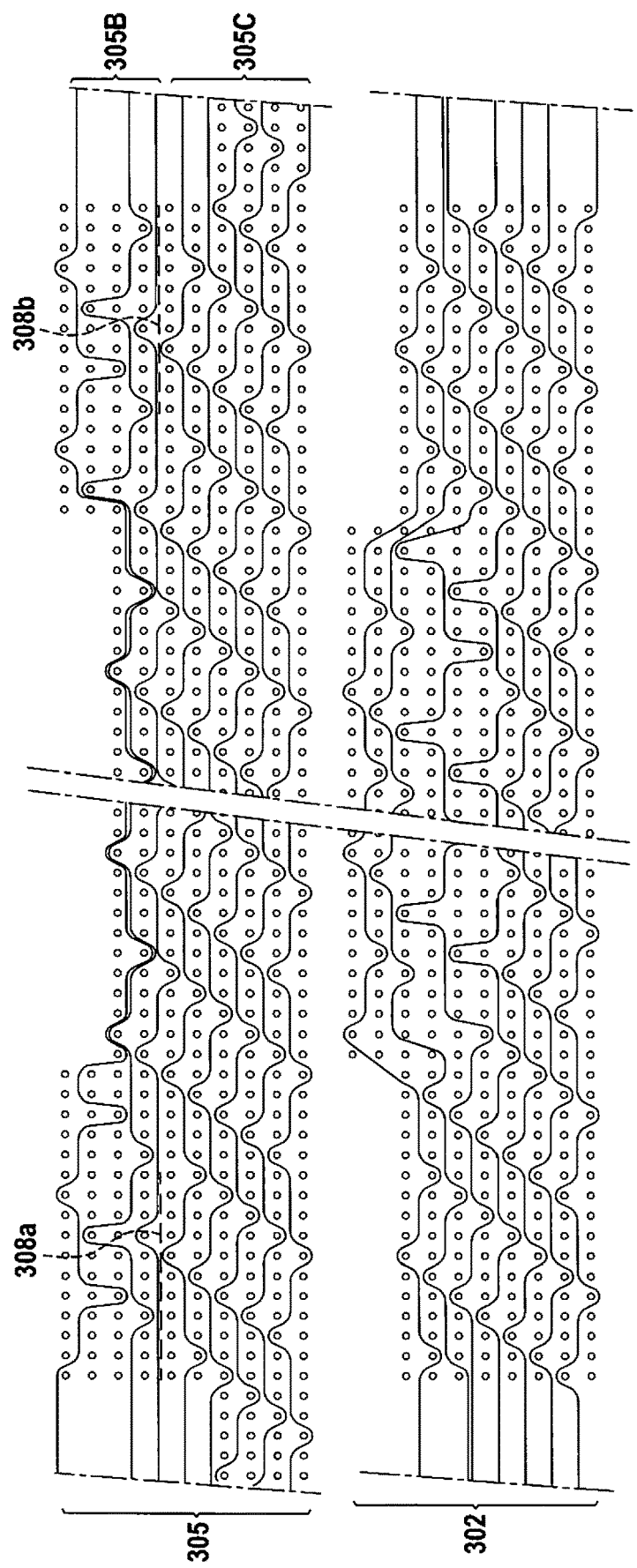

FIG. 5C, which corresponds to FIG. 4C, shows a weave plane of the portions 302 and 305 in the vicinity of the connection with the portion 304, i.e. in the segments 305B and 305C for the portion 305. It can be seen that the segments 305B and 305C are interlinked in their central portion leaving non-interlinked zones 308a and 308b in the lateral portions.

In its lateral portions, the portion 305 presents a number of warp yarn layers that is greater than the number of warp yarn layers in its central portion, with the difference corresponding to the difference between the number of warp yarn layers in the lateral portions of the portion 302 and the number of warp yarn layers in the central portion of the portion 302. All of the warp yarn layers of the portion 305 are interlinked by weaving. In order to avoid floating too many weft yarns in the thicker portions of the portions 302 and 305, it is possible in certain zones of the fiber blank to take two warp yarns of a given column in two superposed layers of warp yarns and process them as a single warp yarn of double weight. This is shown in FIGS. 5B and 5C in the thicker portions of the portions 302 and 305.

FIG. 5D, which corresponds to FIG. 4D, shows a weave plane of the portion 304 in the segment 304A. The presence of non-linked zones 309a and 309b can be seen.

Advantageously, a row of fiber blanks is woven continuously in the form of a strip 3000 (FIG. 3), with two adjacent blanks having opposite longitudinal directions. Thus, the portions 302 and 306 of the blank 300 are extended by the portions 303' and 306' of the following blank 300'. At the other end of the blank 300, the portion 304 is extended by the portion 304" of the preceding blank 300". Zones of extra length are arranged between adjacent blanks (extra length solely of warp yarns) in order to form transition zones. It should be observed that a plurality of parallel rows of blanks may be woven in a single strip, with zones of extra length then preferably being arranged likewise between parallel rows (extra length solely of weft yarns).

Figure 6:
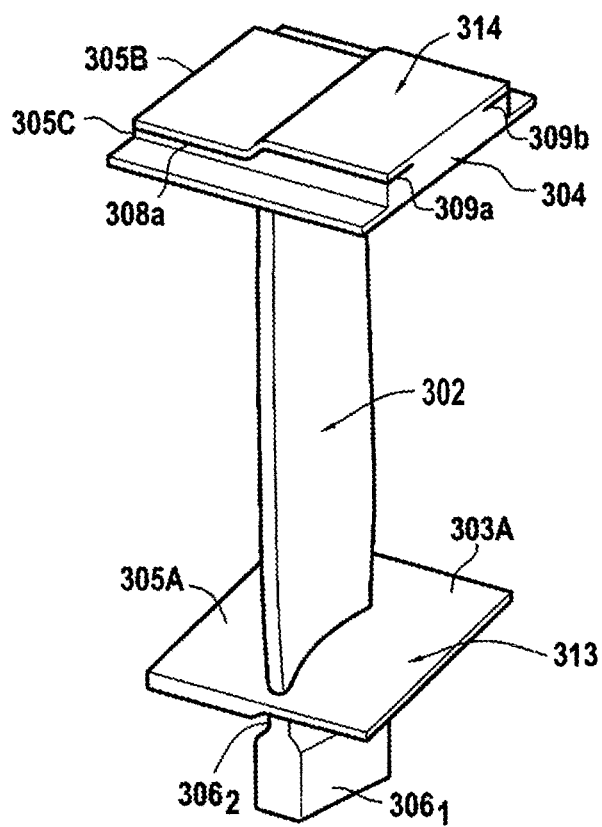
FIGS. 6 to 8 show successive steps in making a fiber preform for a rotor blade from the FIG. 3 fiber blank.
Figure 7:
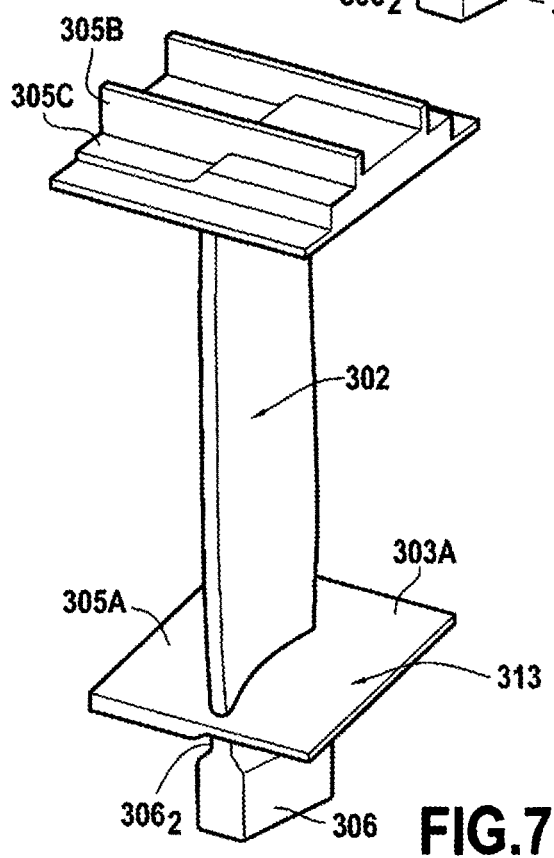
Figure 8:
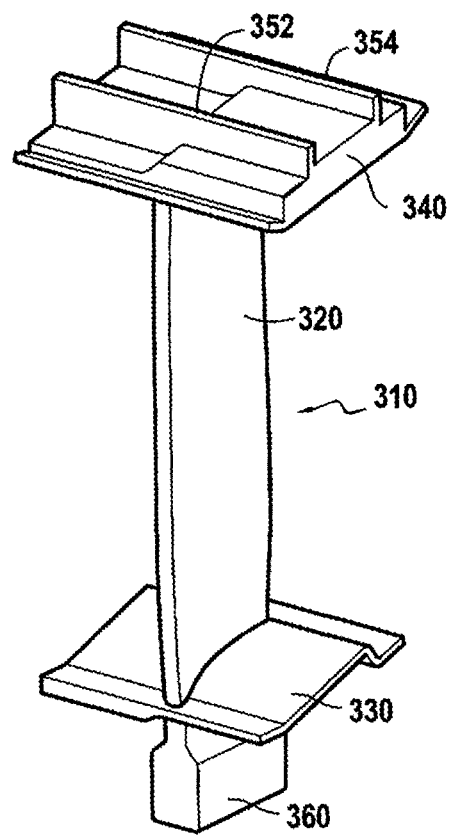

FIGS. 6 to 8 are highly diagrammatic and they show how a fiber preform of shape similar to that of the blade that is to be fabricated can be obtained starting from a blank 300.

A blank 300 is cut out from the strip 3000 by cutting the ends of the portions 303 and 306 in planes P1 and P2 and the end of the portion 304 in a plane P3. The portion 305 is cut at the end of the segment 305A in a plane P4 and at the ends of the segments 305B and 305C in a plane P5, the fractions of the portion 305 that extend between the planes P4 and P5 being eliminated.

The segment 303A is deployed along arrow f1 of FIG. 3. The segment 305A is deployed along arrow f2 of FIG. 3. The deployed segments 205A and 205B form a plate 313 (FIG. 6) that, after molding, is to form the inner platform preform of the blade that is to be fabricated. In the weft direction, the portion 305 presents a width greater than the width of the portion 304, projecting out from either side thereof (see in particular FIGS. 4A and 4B) so as to be capable of forming preform portions corresponding to the upstream and downstream spoilers of the inner platform of the blade that is to be fabricated.

The segments 305B and 305C that are partially interlinked by weaving are deployed along arrow f3 in FIG. 3. The portion 304 is folded along arrow f4 in FIG. 3. The deployed segments 305B and 305C and the folded portion 304 form a plate 314 that is to form the head preform and the head wiper preforms of the blade that is to be fabricated. There can be seen the excess width of the portion 305 used for forming the upstream and downstream spoiler preforms in the head preform of the blade that is to be fabricated.

Thereafter, as shown in FIG. 7, the portions adjacent to the non-interlinked zones 308a-309a and 308b-309b on the outside can be deployed so as to form head wiper preforms of the blade that is to be fabricated. The non-interlinked zones 308a and 309a extend each other so as to form a non-interlinked zone that runs continuously in the warp direction all along the upstream edge of the plate 314 between two opposite sides of the plate 314 and over a distance that is limited in the weft direction from the upstream edge of the plate 314.

In similar manner, the non-interlinked zones 308b and 309b extend each other to form a non-interlinked zone running continuously in the warp direction all along the downstream edge of the plate 314 between two opposite sides of the plate 314 and over a distance that is limited in the warp direction from the downstream edge of the plate 314.

A fiber preform 320 of the blade that is to be fabricated is then obtained by molding the portion 302 with deformation in order to reproduce the curved profile of the blade airfoil and deforming the plates 313 and 314 in order to reproduce shapes similar to those of the inner platform and of the head of the blade, and also so as to confer orientations to the inner platform preform and to the head preform that correspond to the orientations desired for the inner platform and for the head relative to the longitudinal direction in the blade that is to be fabricated, as shown in FIG. 8 (where the mold is not shown). This produces the preform 310 with an airfoil preform 320, a root preform 360 (together with a tang preform), a bottom platform preform 330, a head preform platform 340, and head wiper preforms 352 and 354.

It should be observed that, advantageously, great freedom is made available for orienting the wiper preforms relative to the head preform. In the blade that is to be fabricated, it is thus possible to obtain any angle that might be desired between each wiper and the outside surface of the head.

In the embodiment of FIGS. 3 to 8, it is advantageous for the head preform to use layers of yarns coming from the root preform of the blade and that are not used in the airfoil preform of the blade, which layers of yarns are caused to bifurcate between the root preform and the portion of the blade preform that forms the head preform and the head wiper preforms.

In another embodiment, the portion of the fiber blank corresponding to the head preform is made from layers of yarns coming from the portion of the blank corresponding to the airfoil preform, the airfoil preform and the resulting airfoil varying in thickness in the longitudinal direction.

For this other embodiment, it is possible to use a woven fiber blank 370 as shown diagrammatically in FIGS. 9 and 10A to 10E, the weaving being performed in the form of a fiber strip made up of one or more rows of blanks.

The blank 370 has a portion 372 for forming the preform for the airfoil of the blade that is to be made. In the example shown, the portion 372 is of thickness that does not vary in the transverse direction between the lateral portions corresponding to the leading and trailing edges. Nevertheless, this thickness in the transverse direction could vary as in the portion 302 of the fiber blank of FIGS. 3 and 4A to 4D.

The blank 370 also has a portion 376 with a segment $376_1$ that is to form the preform for the root of the blade that is to be made and a segment $376_2$ that is to form the preform of the tang of the blade that is to be made. The portion 372 is in continuity with the segment $376_2$, with the numbers of layers of warp yarns in the portion 372 and in the structure $376_2$ being equal in this example. Nevertheless, as in the example of FIGS. 3 and 4A to 4D, it would be possible to have a portion $376_2$ of thickness greater than the thickness of the portion 372. The segment $376_1$ presents thickness greater than the thickness of the stream $376_2$, e.g. obtained by increasing the weight and/or the thread count of the weft yarns or by introducing an insert, as in the example of FIGS. 3 and 4A to 4D.

The blank also has a portion 373 that runs along a face 376a of the portion 376 without being interlinked therewith. The warp yarn layers of the portion 373 cross through the portion 372 where it connects with the portion 376 and form a portion 375 by being woven with one or more layers of warp yarns from the portion 372 at one or more levels thereof in the longitudinal direction, e.g. the warp yarn layers $372_1$ and $372_2$, the thickness of the portion 372 thus decreasing in the longitudinal direction going from its end connected to the portion 376.

The portion 375 runs along the face 372b of the portion 372 opposite from the face 372a that corresponds to the face 376a of the portion 376. The portion 375 is not interlinked by weaving with the portion 372.

At the end of the portion 372 remote from its end connected to the portion 376, a portion 374 is formed that extends the portions 372 and 375, uniting their wrap yarn layers by weaving.

A segment 373A of the portion 373 running along the face 376a of the portion 376 and a segment 375A of the portion 375 extending the segment 373A and running along the face 372b of the portion 372 are to form the preform for the inner platform of the blade that is to be made.

Figure 9:
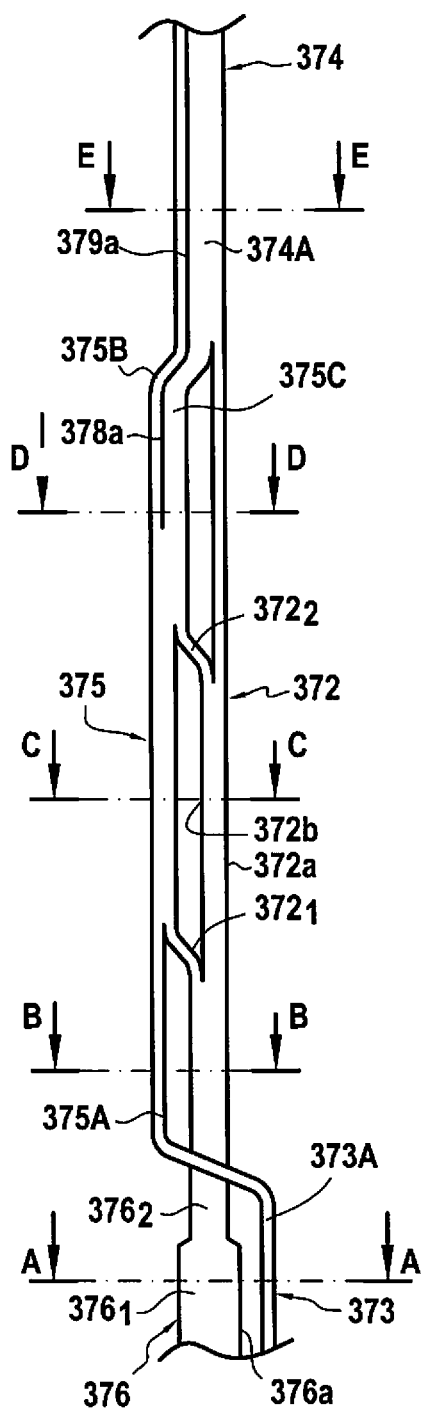
FIG. 9 is a highly diagrammatic side elevation view of another arrangement of sets of yarn layers in a fiber blank made by multilayer weaving for the purpose of obtaining a fiber preform for a blade of the type shown in FIG. 2.
Figure 10E:
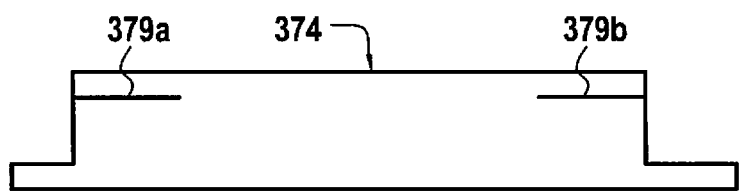
FIGS. 10A, 10B, 10C, 10D, and 10E are section views on a larger scale on planes A, B, C, D, and E of FIG. 9.
Figure 10D:
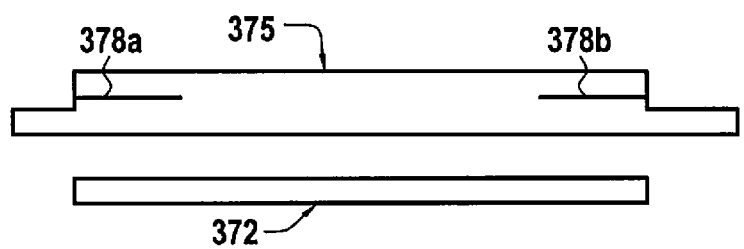
Figure 10C:
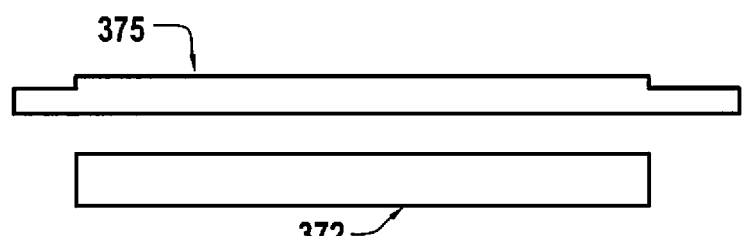
Figure 10B:
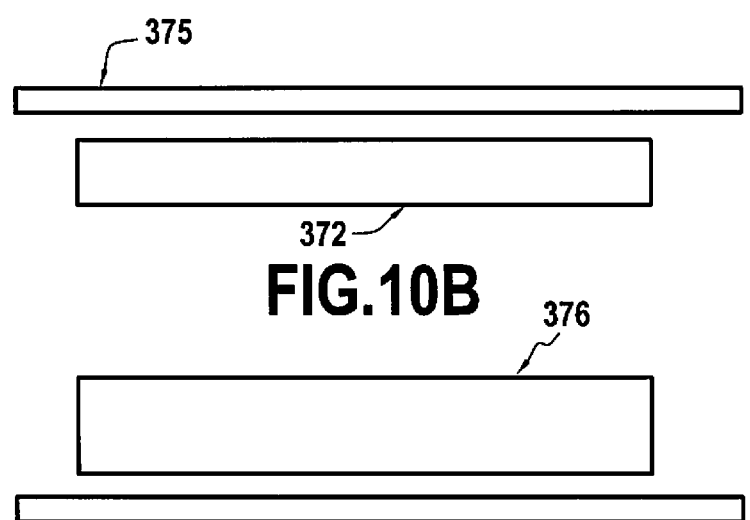
Figure 10A:

In its terminal portion prior to connecting with the portion 374, the portion 375 presents adjacent segments 375B and 375C that are to form a part of the head preform and of the preform for the head wipers of the blade that is to be made. The segments 375B and 375C are interlinked solely in their central portion in order to provide non-interlinked zones 378a and 378b that run in the warp direction all along their upstream and downstream edges and in the weft direction over a limited distance from each of those edges (FIGS. 9 and 10D).

The portion constituting preforms for the head and for the head wipers of the blade that is to be made, which is complementary to the portion formed by the segments 375B and 375C, comes from a segment 374A of the portion 374 situated extending the segments 375A and 375B of the portion 372. During weaving, non-interlinked zones 379a and 379b are provided in the segment 374A all along it in the warp direction and over a limited distance from each of its upstream and downstream edges in the weft direction (FIG. 4D). The non-interlinked zones 378a and 379a lie in continuity with each other, as do the non-interlinked zones 378b and 379b. The non-interlinked zones 378a, 378b, 379a, and 379b are used for deploying the preforms for the head wipers of the blade that is to be made.

It should be observed that FIGS. 10A, 10B, 10C, 10D, and 10E are section views on planes A, B, C, D, and E respectively in the segment 373A, in the segment 375A, in the middle portion of the portion 375 after connection of the warp yarn layers $372_1$, in the segments 375B and 375C, and in the segment 374A.

After making appropriate cuts, deploying the segments 373A, 375A, and 375B-375C and folding the segment 374A, deploying the portions adjacent to the non-interlinked zones, and shaping by molding, a blade preform is obtained having an airfoil preform portion, a root and tang preform portion, a bottom platform preform portion, and a head preform portion together with head wiper preform portions, in a manner similar to that described with reference to FIGS. 6 to 8.

In a variant of the two above-described embodiments, it would also be possible to bring additional yarn layers to the portion of the blank corresponding to the head preform that do not necessarily come from the portion of the blank corresponding to the root or airfoil preforms. Also in a variant, it would also be possible to remove yarn layers from the portion of the blank corresponding to the head preform.

The three different ways described of bringing the warp yarn layers to the portion of the blank corresponding to the head and wiper preform may be implemented separately, or combined in pairs, or all three of them may be combined.

In remarkable manner, a blade fiber preform is obtained in a single piece incorporating the head preform and the wiper preforms, while limiting crossings between fiber blank portions during weaving. This results from making a portion of the blade preform forming a head preform and head wiper preforms by means of a set of yarn layers that are interlinked by weaving while leaving non-interlinked zones that enable the head wiper preforms to be deployed relative to the head preform.

Furthermore, when the blade that is to be fabricated has more than two head wipers, the desired number of head wiper preforms can be obtained by arranging a corresponding number of non-adjacent non-interlinked zones between the upstream and downstream edges of the plate corresponding to the head, such as the plate 314 of FIG. 6.

It should be observed that the invention is applicable when the inner platform preform of the blade is made separately with an opening that substantially reproduces the profile of the airfoil of the blade that is to be made. Under such circumstances, a fiber blank is made by weaving without a portion that corresponds to the inner platform preform, i.e. in the embodiment of FIG. 3, without the portion 303. The separately made inner platform preform can then be engaged on the woven fiber blank up to its desired position, prior to deploying the portion of the blade preform that forms the head preform and the head wiper preforms. It would also be possible to fit the outer platform preform at a later stage in fabrication, or to make an outer platform and fit it after fabricating the blade with the airfoil and the outer platform.

Figure 11:
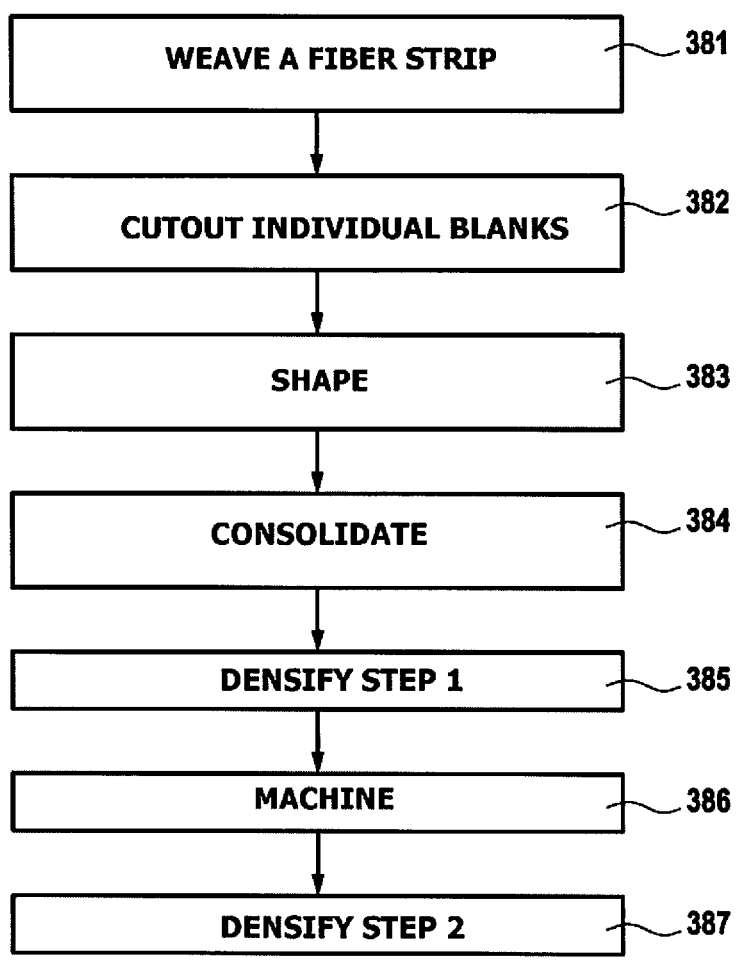
FIG. 11 shows the successive steps in an implementation of the method of fabricating a turbine engine rotor blade in accordance with the invention.

Successive steps of a method of fabricating a blade out of ceramic matrix composite (CMC) material are given in FIG. 11.

In a step 381, a fiber strip is woven by three-dimensional weaving that comprises a plurality of fiber blanks, as shown in FIG. 3 or in FIG. 9, possibly with a plurality of rows of fiber blanks oriented in the warp direction.

In a step 382, the individual fiber blanks are cut out.

In a step 383, a fiber blank is shaped in a mold, e.g. made of graphite, in order to shape the airfoil preform, the root preform, the inner platform preform, the head preform, and the head wiper preforms (as shown for example in FIGS. 6 to 8), in order to obtain a blade preform.

In a step 384, the blade preform is consolidated. In known manner, consolation may be performed by impregnating with a resin that is cured and pyrolyzed, the quantity of consolidation resin being selected so that the residue of pyrolysis binds together the fibers of the preform sufficiently strongly to enable the preform to be handled while conserving its shape and without any assistance from tooling. It is possible to use a carbon precursor resin or a ceramic precursor resin. The impregnation with the consolidation resin may be performed by infusion or injection into the mold, or by impregnation in the fiber blank stage, prior to shaping. In a variant that is also known, consolidation may be performed by partial densification with a ceramic material using a process known as chemical vapor infiltration (CVI).

The consolidated preform can be extracted from the shaping tooling in order to perform densification with a ceramic matrix, e.g. made of silicon carbide SiC. The densification may be performed by CVI.

The densification may be performed in two successive steps (steps 385 and 387) that are separated by a step 386 of machining the blade to the desired shapes and dimensions.

It should be observed that pre-machining may be used after consolidation and prior to densification, and in particular pre-machining of the inner platform and of the head in order to eliminate excess thicknesses, and also pre-machining of the head wipers, so as to come close to the blade shape of FIG. 2.

It should also be observed that an embrittlement relief interphase coating may be formed between the fibers of the preform and the ceramic matrix, in well-known manner.

Embodiment: Compressor Rotor Wheel Blade

The above description relates to a turbine rotor wheel blade made of CMC material.

The invention is also applicable to rotor wheel blades for a gas turbine compressor. Under such circumstances, when the temperatures encountered in operation are lower, in particular for the upstream stages of a compressor, instead of using a CMC material, it is possible for example to use an organic matrix composite (OMC) material made with carbon or glass fibers and a polymer matrix.

Thus, after weaving a set of fiber strips, cutting out individual blanks, and shaping using shaping tooling, a resulting blade preform held in its tooling is impregnated with a resin by injection or infusion. Heat treatment for curing the resin is then performed. A plurality of successive cycles of impregnation with a resin and of curing the resin may be performed. Machining may be performed between two cycles and/or after the end of densification with the polymer matrix. The resin used is a polymer matrix precursor resin, such as an epoxy, bismaleimide, or polyimide resin, for example.

Embodiment: Turbine Nozzle Blade

FIGS. 12 and 13A to 13D are highly diagrammatic and show a first embodiment of a fiber blank 400 from which it is possible to shape a fiber preform for a blade so that after densifying the preform with a matrix and after optional machining, a composite material blade is obtained incorporating an airfoil, an inner platform, abradable support elements, an outer platform, and mounting hooks, the blade being of the same type as the vane 110 shown in FIG. 1.

Various weaves may be used for weaving the blank 400, e.g. a multi-satin weave similar to that of FIGS. 5A to 5D, or any other weave as described in particular in above-mentioned Document WO 2006/136755. For the specific application of a turbine nozzle blade, the yarns used for weaving are made of refractory material, in particular of ceramic material, such as for example yarns based on silicon carbide (SiC) as supplied under the name "Nicalon" by the Japanese supplier Nippon Carbon.

The blank 400 comprises a portion 402 that is to form the airfoil preform of the blade that is to be made. In the example shown, the portion 402 is of substantially constant thickness. In a variant, the thickness of the portion 402 could vary between its longitudinal edges in similar manner to the portion 302 in the embodiment of FIG. 3.

The blank 400 also comprises a portion 403 with a segment 403A running along a first face 402a of the portion 402 without being interlinked with the portion 402. The warp yarns of the warp yarn layers of the portion 403 cross the portion 402 in order to run along the face 402b of the portion 402 that is opposite from the face 402a. The portion 403 extends along the face 402b of the portion 402 without being interlinked with the portion 402, over a distance that corresponds substantially to the longitudinal dimension of the airfoil of the blade that is to be fabricated. Starting from its end remote from its end situated at the crossing by the portion 403, the portion 402 is united with the portion 403 by weaving in order to form a portion 404.

The segment 403A of the portion 403 running along the face 402a of the portion 402, and a segment 403B of the portion 403 extending the segment 403A, after crossing through the portion 402, are for forming the preform for the inner platform and the preforms for the abradable support elements of the blade that is to be made. Non-interlinked zones 403a and 403b are provided substantially at half-thickness in the segments 403A and 403B, the non-interlinked zone 403a running in the warp direction all along the upstream edges of the segments 403A and 403B, and in the weft direction over a limited distance from each of these upstream edges, and the non-interlinked zone 403b running in the warp direction all along the downstream edges of the segments 403A and 403B and in the weft direction over a limited distance from each of these downstream edges (FIGS. 12, 13A, and 13B). As described below, the non-interlinked zones 403a and 403b serve to make it possible to deploy preforms for abradable support elements of the blade that is to be made.

In its terminal portion prior to connection with the portion 404, the portion 403 presents a segment 403C that is to form a portion of the outer platform preform and of mounting hook preforms of the blade that is to be made. Non-interlinked zones 403c and 403d are provided substantially at half-thickness in the segment 403C, the non-interlinked zone 403c running in the warp direction all along the upstream edge of the segment 403C and in the weft direction over a limited distance from the upstream edge, and the non-interlinked zone 403d running in the warp direction all along the downstream edge of the segment 403C and in the weft direction over a limited distance from the downstream edge (FIGS. 12 and 13C).

The portion for the outer platform preform and the mounting hook preforms of the blade that is to be made, which is complementary to the portion by the segment 403C, comes from a segment 404A of the portion 404. During weaving, non-interlinked zones 404a and 404b are provided in the segment 404A all along it in the warp direction and over a limited distance from each of its upstream and downstream edges in the weft direction (FIGS. 12 and 13D). The non-interlinked zones 403c and 404a are in continuity with each other, as are the non-interlinked zones 403d and 404b. As described below, the non-interlinked zones 403c, 403d, 404a, and 404b serve to make it possible to deploy the mounting hook preforms of the blade that is to be made.

Advantageously, a row of fiber blanks is woven continuously in the form of a strip 4000 (FIG. 12), with two adjacent blanks having opposite longitudinal directions. Thus, the portions 402 and 403 of the blank 400 are extended by the portions 402' and 403' of the following blank 400'. At the other end of the blank 400, the portion 404 is extended by the portion 404" of the preceding blank 400". Zones of extra length are arranged between adjacent blanks (extra length solely of warp yarns) in order to form transition zones. It should be observed that a plurality of parallel rows of blanks may be woven in a single strip, with zones of extra length then preferably being provided also between parallel rows (extra length solely of weft yarns).

FIGS. 12 and 14 to 16 are highly diagrammatic and they show how a fiber preform of a shape similar to that of the blade that is to be fabricated can be obtained from a blank 400.

A blank 400 is cut out from the strip 4000 by cutting the portion 403 at the ends of the segments 403A and 403B in planes P1 and P2 and by cutting the portion 402 in a plane P3 situated in front of the location of the crossing by the portion 403. The portion 404 is cut at the end of the segment 404A in a plane P4. The segment 403C is cut in a plane P5, the fractions of the portion 403 running between the planes P2 and P5 being eliminated.

Figure 14:
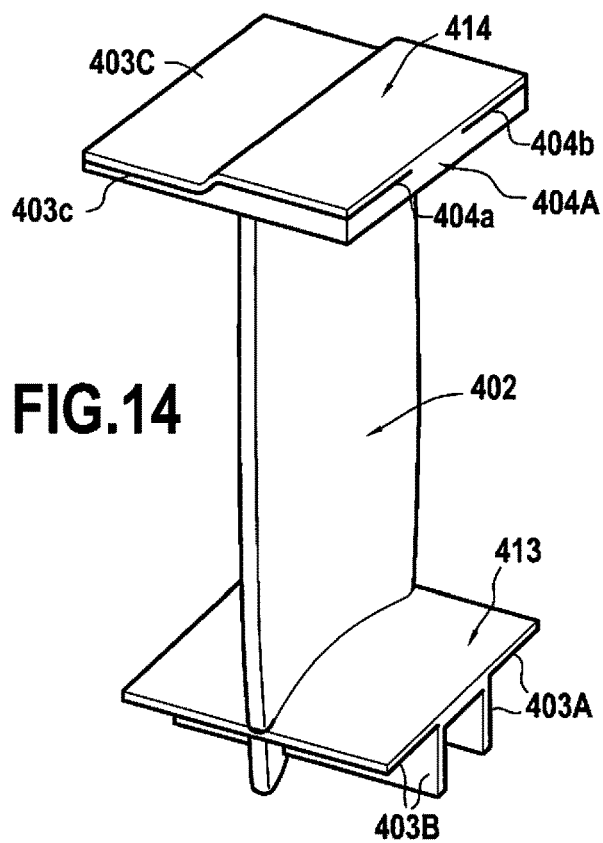
FIGS. 14 to 16 show successive steps in making a fiber preform for a stator wheel blade, from the blank of FIG. 12.

The segments 403A and 403B are deployed along arrows f1 and f2 in FIG. 12. As shown in FIG. 14, the portions of the segments 403A and 403B situated on the outside form a plate 413 that, after molding, is to form the inner platform preform, while the portions of the segments 403A and 403B adjacent to the non-interlinked zones 403a and 403b, on the inside can be deployed to be able to form preforms for the abradable support elements of the blade that is to be fabricated.

The segment 403C is deployed along arrow f3 in FIG. 12. The segment 404A is folded along arrow f4 of FIG. 12. The deployed segment 403C and the folded segment 404 form a plate 414 that is to form the preform for the outer platform and the preforms for the mounting hooks of the blade that is to be fabricated.

Figure 15:
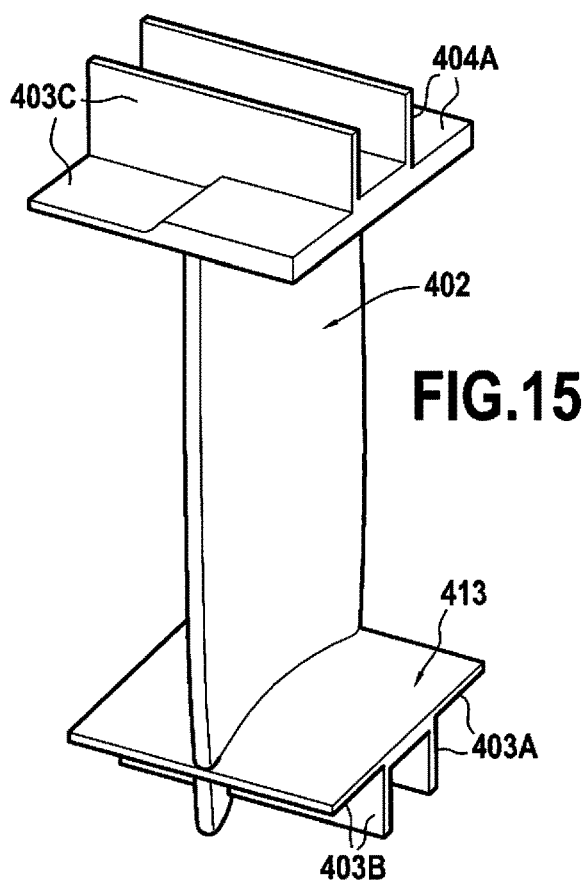

Thereafter, as shown in FIG. 15, the portions adjacent to the non-interlinked zones 403c, 403d, 404a, and 404b, on the outside, can be deployed so as to form mounting hook preforms for the blade that is to be fabricated. The non-interlinked zones 403c and 404a extend each other to form a non-interlinked zone running continuously in the warp direction all along the upstream edge of the plate 414 between two opposite sides of the plate 414, and over a limited distance in the weft direction from the upstream edge of the plate 414. In similar manner, the non-interlinked zones 403d and 404b extend each other to form a non-interlinked zone extending continuously in the warp direction all along the downstream edge of the plate 414, between two opposite sides of the plate 414, and over a limited distance in the weft direction from the downstream edge of the plate 414.

Figure 16:
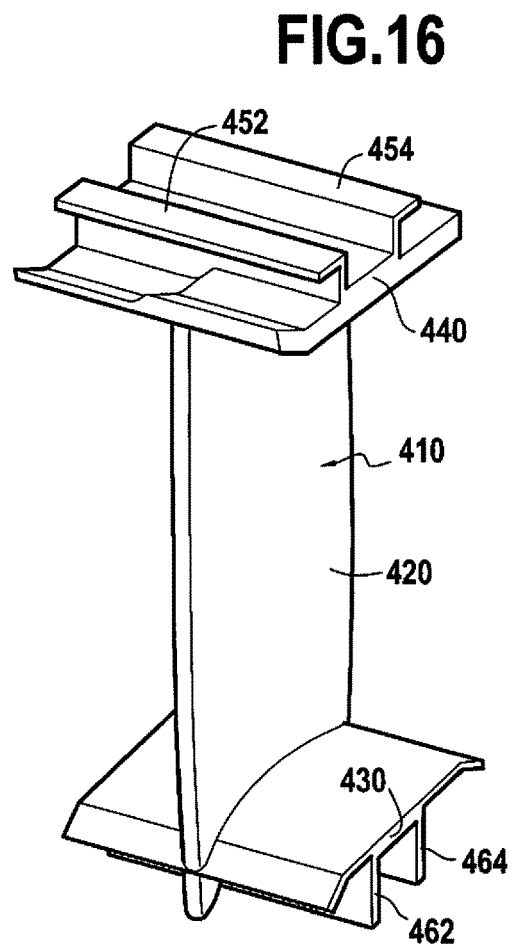

A fiber preform 410 of the blade that is to be fabricated is then obtained by molding in order to obtain the curved profile of the airfoil of the blade, shapes that are similar to those of the inner and outer platforms of the blade, orientations of the preforms of the inner and outer platforms that correspond to the desired orientations for the inner and outer platforms relative to the longitudinal direction in the blade that is to be fabricated, and also shapes corresponding to the shapes of the support elements and the mounting hooks, as shown in FIG. 16 (the mold not being shown). The preform 410 is thus obtained comprising an airfoil preform 420, an inner platform preform 430, preforms 462 and 464 for abradable support elements, an outer platform preform 440, and mounting hook preforms 452 and 454.

FIGS. 17 and 18A to 18D are highly diagrammatic, showing a second embodiment of a fiber blank 500 from which it is possible to shape a fiber preform for a blade so that after densifying the preform with a matrix and after optional machining, a composite material blade is obtained incorporating an airfoil, an inner platform, abradable support elements, an outer platform, and mounting hooks, the blade being of the same type as the vane 110 shown in FIG. 1.

The fiber blank 500 differs from the fiber blank 400 in that it is substantially symmetrical about a middle transverse plane, the portion of the blank corresponding to the inner platform preform and the abradable supports being of a configuration similar to the configuration of the portion of the blank corresponding to the outer platform preform and the mounting hooks.

Thus, the blank 500 has a portion 502 that is to form the preform for the airfoil of the blade that is to be made. In the example shown, the portion 502 is of thickness that is substantially constant. In a variant, the thickness of the portion 502 could vary between its longitudinal edges in similar manner to the portion 302 in the embodiment of FIG. 3.

The blank 500 also comprises a portion 503 that runs along a face 502b of the portion 502 without being linked thereto by weaving. At the longitudinal ends of the portion 502, the yarn layers of the portions 502 and 503 are united by weaving in order to form portions 504 and 505.

A segment 505A of the portion 505 and a segment 503A of the portion 503 that connects with the segment 505A are for forming a preform for the inner platform and preforms for the abradable supports of the blade that is to be made. Non-interlinked zones 505a, 505b, and 503a, 503b are provided substantially at half-thickness in the segments 505A and 503A, the non-interlinked zones 505a and 503a running in the warp direction all along the upstream edges of the segments 505A and 503A and in the weft direction over a limited distance from each of these upstream edges, and the non-interlinked zones 505b and 503b running in the warp direction all along the downstream edges of the segments 505A and 503A and in the weft direction over a limited distance from each of these downstream edges (FIGS. 17, 18A, and 18B). The non-interlinked zones 505a, 503a, 505b, and 503b serve to make it possible to deploy preforms for the abradable support elements of the blade that is to be made.

A segment 504A of the portion 504 and a segment 503B of the portion 503 that connects with the segment 505A are for forming an outer platform preform and mounting hook preforms of the blade that is to be made. Non-interlinked zones 503c, 504a, and 503d, 504b are provided substantially at half-thickness in the segments 503B and 504A, the non-interlinked zones 503c and 504a running in the warp direction all along the upstream edges of the segments 503B and 504A and in the weft direction over a limited distance from these upstream edges, and the non-interlinked zones 503d and 504b extending in the warp direction all along the downstream edges of the segments 503B and 504A and in the weft direction over a limited distance from the downstream edges (FIGS. 17, 18C, and 18D). The non-interlinked zones 503c, 504a, 503d, and 504b serve to make it possible to deploy the mounting hook preforms of the blade that is to be made.

Advantageously, at least one row of fiber blanks 500 is woven continuously in the form of a strip 5000 (FIG. 17).

FIGS. 17 and 19 to 21 are highly diagrammatic, showing how a fiber preform having a shape close to that of the blade that is to be fabricated can be obtained from the blank 500.

A blank 500 is cut out from the strip 5000 by cutting the portions 505 and 504 in planes P1 and P4 and by cutting the portion 503 in planes P2 and P5, the fractions of the portion 503 that run between the planes P2 and P5 being eliminated.

The segments 505A and 503A are deployed along arrows f1 and f2 in FIG. 17 and they form a plate 513 (FIG. 19) that, after molding, is to form the inner platform preform and the preforms of abradable support elements of the blade that is to be fabricated. The non-interlinked zones 505a and 503a extend each other to form a non-interlinked zone running continuously in the warp direction all along the upstream edge of the plate 513 between two opposite sides of the plate 513, and over a limited distance in the weft direction from the upstream edge of the plate 513. The non-interlinked zones 505b and 503b extend each other to form a non-interlinked zone running continuously in the warp direction all along the downstream edge of the plate 513 between two opposite sides of the plate 513, and over a limited distance in the weft direction from the downstream edge of the plate 513.

The segments 503B and 504A are deployed along arrows f3 and f4 in FIG. 17 and they form a plate 514 (FIG. 19) that is to form the preform for the outer platform and the preforms for the mounting hooks of the blade that is to be fabricated. The non-interlinked zones 503c and 504a extend each other to form a non-interlinked zone running continuously in the warp direction all along the downstream edge of the plate 514 between two opposite sides of the plate 514, and over a limited distance in the weft direction from the upstream edge of the plate 514. The non-interlinked zones 503d and 504b extend each other to form a non-interlinked zone running continuously in the warp direction all along the downstream edge of the plate 514 between two opposite sides of the plate 514, and over a limited distance in the weft direction from the downstream edge of the plate 514.

Thereafter, as shown in FIG. 20, the portions adjacent to the non-interlinked zones 505a, 503a, 505b, and 503b, on the inside, are deployed so as to form preforms for abradable support elements of the blade that is to be fabricated, while the portions adjacent to the non-interlinked zones 503c, 503d, 504a, and 504b, on the outside, are deployed so as to form preforms for the mounting hooks of the blade that is to be fabricated.

A fiber preform 510 of the blade that is to be fabricated is then obtained by molding in order to obtain the curved profile of the airfoil of the blade, shapes similar to the shapes of the inner and outer platforms of the blade, orientations of the inner and outer platform preforms corresponding to the orientations desired for the inner and outer platforms relative to the longitudinal direction of the blade that is to be fabricated, and shapes corresponding to the shapes of the support elements and of the mounting hooks, as shown in FIG. 21 (the mold not being shown). The preform 510 is thus obtained comprising an airfoil preform 520, an inner platform preform 530, preforms 562 and 564 for abradable support elements, an outer platform preform 540, and preforms 552, 554 for mounting hooks.

In remarkable manner, in both of the above-described embodiments, a blade fiber preform is obtained as a single piece incorporating inner and outer platform preforms, abradable support element preforms, and mounting hook preforms, while limiting crossings between portions of the fiber blank during weaving. This results from making a blade preform portion that forms a platform preform and support element preforms or mounting hook preforms by means of a set of yarn layers that are interlinked by weaving, with non-interlinked zones being provided so as to make it possible to deploy support element preforms or mounting hook preforms relative to the platform preforms.

Naturally, it is possible to make abradable support elements of shapes other than the L-shaped profile elements 162 and 164.

Thus, FIG. 22 shows support elements 162' and 164' that project substantially radially from the outside face of the inner platform 130 and on which it is possible to fasten an intermediate support 165 carrying blocks 166' of abradable material upstream and downstream in order to co-operate with the wipers of rotor wheels that are adjacent to the nozzle on the upstream and downstream sides.

It is also possible to envisage having a single abradable support element projecting from the central portion of the outside face of the inner platform.

In order to obtain a turbine nozzle blade made out of CMC from a woven fiber blank, it is possible to proceed as described above with reference to FIG. 11.

Embodiment: Compressor Guide Vane Blade

The description above relates to making a turbine nozzle blade out of CMC material.

The invention is also applicable in the same manner to making CMC material guide vane blades for a gas turbine compressor.

When the temperatures encountered in service are lower, in particular for the upstream stages of a compressor, it is possible to use guide vane blades that are not made of CMC material, but that are made of organic matrix composite (OMC) material, made using carbon or glass fibers with a polymer matrix.

In order to obtain a compressor guide vane blade made of OMC from a woven fiber blank, it is possible to proceed as described above for a compressor rotor wheel blade made of OMC.

The method described for the two last-described embodiments makes it possible to obtain a blade incorporating an airfoil, an outer platform, mounting hooks, an inner platform, and abradable support elements.

Nevertheless, the method is also applicable to making a blade incorporating an airfoil, an outer platform, mounting hooks, and an inner platform but without incorporating abradable support elements, and indeed to making a blade incorporating an airfoil, an outer platform, an inner platform, and at least one abradable support element, but without incorporating mounting hooks.

Variant Embodiments

In the embodiments described of a turbine nozzle blade, the preform for the blade airfoil presents thickness that is constant in the longitudinal direction. In a variant, this thickness could be made to vary in the same manner as that described with reference to FIGS. 9 and 10A to 10E for a turbine rotor wheel blade. The same applies for a compressor rotor wheel blade and for a compressor guide vane blade.

In the embodiments of FIGS. 3, 9, and 12, the longitudinal direction of the fiber blank in the woven strip may be reversed.

In the turbine nozzle embodiments that are described, the mounting hooks are associated with the outer platform and the abradable support element(s) is/are associated with the inner platform. In a variant, it is possible to associate the mounting hooks with the inner platform and one or more abradable support elements with the outer platform.

Above, the fiber blanks are described as being woven with the warp direction corresponding to their longitudinal direction. In a variant, the weaving could be performed with the longitudinal direction of the fiber blanks corresponding to the weft direction, with weft and warp then being interchanged.

The invention claimed is:

1. A turbine engine blade comprising an airfoil, a first platform situated at a longitudinal end of the airfoil and having an inside face defining a flow passage and an outside face opposite from the inside face, and at least one functional element extending from the outside face of the first platform and connecting with said outside face in a direction that is substantially circumferential;

the blade being a single piece of composite material comprising multilayer woven fiber reinforcement densified by a matrix; and the fiber reinforcement being a single piece with a first portion forming reinforcement for the airfoil and a second portion forming reinforcement for the first blade platform and for the at least one functional element;

in which blade the second portion of the fiber reinforcement comprises a set of yarn layers all interlinked by weaving, apart from in a separation zone between the reinforcement for the or each functional element and the reinforcement for the first platform, wherein the separation zone is formed during the weaving of the set of yarn layers.

2. A blade according to claim 1, in which the set of yarn layers of the second reinforcement portion includes a group of yarn layers in common with the airfoil reinforcement.

3. A turbine or compressor wheel for a turbine engine and including blades according to claim 1 made of ceramic matrix composite material.

4. A turbine engine having at least one turbine or compressor rotor wheel according to claim 3.

5. A turbine engine compressor wheel including turbine engine blades according to claim 1 made of organic matrix composite material.

6. A turbine engine having at least one turbine or compressor rotor wheel according to claim 5.

7. The turbine engine blade of claim 1, wherein the fiber reinforcement is configured such that the airfoil is solid with respect to a transverse cross-sectional area.

8. A turbine engine rotor blade comprising an airfoil, an outer platform forming a blade head situated at a longitudinal end of the airfoil and having an inside face defining a flow passage and an outside face opposite from the inside face, and head wipers extending from the outside face of the head and connecting with said outside face in a direction that is substantially circumferential;

the blade being a single piece of composite material comprising multilayer woven fiber reinforcement densified by a matrix; and the fiber reinforcement being a single piece with a first portion forming reinforcement for the airfoil and a second portion forming reinforcement for the head and reinforcement for the head wipers;

in which blade the second portion of the fiber reinforcement comprises a set of yarn layers all interlinked by weaving, apart from in separation zones between the reinforcement for the head wipers and the reinforcement for the head, wherein the separation zones are formed during the weaving of the set of yarn layers.

9. A blade according to claim 8, in which the set of yarn layers of the second portion of the fiber reinforcement includes a group of yarn layers taken from the first portion of the fiber reinforcement.

10. A turbine or compressor wheel for a turbine engine and including blades according to claim 8 made of ceramic matrix composite material.

11. A turbine engine compressor wheel including blades according to claim 8 made of organic matrix composite material.

12. A turbine engine stator blade comprising an airfoil, a first platform situated at a longitudinal end of the airfoil and having an inside face defining a flow passage and an outside face opposite from the inside face, and blade mounting hooks extending from the outside face of the first platform and connecting with said outside face in a direction that is substantially circumferential;

the blade being a single piece of composite material comprising multilayer woven fiber reinforcement densified by a matrix; and the fiber reinforcement being a single piece with a first portion forming reinforcement for the airfoil and a second portion forming reinforcement for the first platform and reinforcement for the mounting hooks;

in which blade the second fiber reinforcement portion comprises a set of yarn layers all interlinked by weaving, apart from in separation zones between the reinforcement for the mounting hooks and the reinforcement for the first platform, wherein the separation zones are formed during the weaving of the set of yarn layers.

13. A blade according to claim 12, in which the set of yarn layers of the second reinforcement portion includes a group of yarn layers in common with the airfoil reinforcement.

14. A turbine or compressor wheel for a turbine engine and including blades according to claim 12 made of ceramic matrix composite material.

15. A turbine engine compressor wheel including blades according to claim 12 made of organic matrix composite material.

16. A turbine engine stator blade comprising an airfoil, a first platform situated at a longitudinal end of the airfoil and having an inside face defining a flow passage and an outside face opposite from the inside face, and at least one abradable support element extending from the outside face of the first platform and connecting with said outside face in a direction that is substantially circumferential;

the blade being a single piece of composite material comprising multilayer woven fiber reinforcement densified by a matrix; and the fiber reinforcement being a single piece with a first portion forming reinforcement for the airfoil and a second portion forming reinforcement for the first platform and reinforcement for the at least one abradable support element;

in which blade the second fiber reinforcement portion comprises a set of yarn layers all interlinked by weaving, apart from in separation zones between the reinforcement for the or each abradable support element and the reinforcement for the first platform, wherein the separation zones are formed during the weaving of the set of yarn layers.

17. A turbine or compressor wheel for a turbine engine and including blades according to claim 16 made of ceramic matrix composite material.

18. A turbine engine compressor wheel including blades according to claim 16 made of organic matrix composite material.

* * * * *